(12) United States Patent
Phillips et al.

(10) Patent No.: US 6,473,084 B1
(45) Date of Patent: Oct. 29, 2002

(54) PREDICTION INPUT

(75) Inventors: G. Michael Phillips, Pasadena; M. Chapman Findlay, III, Los Angeles; William P. Jennings, Simi Valley; Stephen A. Klein; Mark E. Rice, both of Pasadena, all of CA (US)

(73) Assignee: C4Cast.Com, Inc., Pasadena, CA (US)

( * ) Notice: Subject to any disclaimer, the term of this patent is extended or adjusted under 35 U.S.C. 154(b) by 0 days.

(21) Appl. No.: 09/392,361

(22) Filed: Sep. 8, 1999

(51) Int. Cl.[7] ................................................ G06T 11/20
(52) U.S. Cl. .......................... 345/440; 700/91; 703/22
(58) Field of Search .......................... 345/115, 440, 345/440.1, 440.2; 73/791; D21/300, 369, 902; 700/92, 324, 31, 44, 45, 91; 703/22; 706/21; 704/216–218, 242, 217; 273/236, 224; 364/412; 377/4; 463/25, 26, 27, 28, 30, 31, 42; 705/14

(56) References Cited

U.S. PATENT DOCUMENTS

| | | | | |
|---|---|---|---|---|
| 5,347,446 A | * | 9/1994 | Iino et al. | 364/149 |
| 5,697,844 A | * | 12/1997 | Von Kohorn | 463/40 |
| 6,236,900 B1 | * | 5/2001 | Geiger | 700/91 |

OTHER PUBLICATIONS

Lennart Ljung, System Identification Theory for the User, 1987, Prentice–Hall, Inc., p. vii–xii.*
Aug. 23, 1999 Printout of web page at http://www.cyberskipper.com.
Aug. 23, 1999 Printout of web page at http://www.cyberskipper.com/1999/howtoplay.html.
Aug. 23, 1999 Printout of web page at http://cyberskipper.longshot.com/training/cs99.cgi/sr0)–select.
Aug. 23, 1999 Printout of web page at http://cyberskipper.longshot.com/1999/stlearn.html.
Aug. 12, 1999 Printout of web page at http://economagic.com.

* cited by examiner

Primary Examiner—Michael Razavi
Assistant Examiner—G. F. Cunningham
(74) Attorney, Agent, or Firm—Mitchell Silberberg & Knupp LLP

(57) ABSTRACT

Initially, a graph is electronically displayed, the graph including a historical portion that includes historical values of the variable over time and also including a future portion. Then, a participant is permitted to designate a point on the future portion of the graph (e.g., by using an input device such as a mouse, a touch-sensitive display screen or the like) and the designated point is converted into a predicted value for the variable at a realization time.

29 Claims, 11 Drawing Sheets

FIG. 3

PREDICTION INPUT

BACKGROUND OF THE INVENTION

1. Field of the Invention

The present invention generally concerns novel techniques for inputting predictions, such as inputting a predicted value for a share of stock or a commodity, into a computer.

2. Description of the Related Art

Forecasting Contests

A number of forecasting contests have been conducted in the past. Such contests range from various wagering events, such as Superbowl pools, to various financial forecasting contests. Typically, such conventional contests seek to identify the best predictor for the outcome of a single event. For example, the website at www.investorsforecast.com allows participants to predict where the Dow Jones Industrial Average (DJIA) will be and what the prices of certain stocks will be at the end of next week. The person submitting the most accurate prediction for the DJIA and the person submitting the most accurate prediction for an individual stock are each given a fixed monetary award, such as $300. Other contests in the financial arena typically allow participants to invest an imaginary amount of money, with the winner being the person whose portfolio is the largest at the end of the contest. One example of such a contest can be seen at www.fantasystockmarket.com.

However, the present inventors have discovered that such conventional contests are inadequate in the following respects. First, the rankings generated by such contests typically do not provide useful information for truly identifying the best forecasters. This is a particularly significant shortcoming with respect to financial and economic forecasting, in which it is very useful for third parties to have that information. In addition, these conventional contests often reward short-term or single-event thinking, and such qualities may not be the most desirable in many cases. Finally, partly because of such short-term and single-event thinking, partly because of the specific events for which predictions are solicited in such conventional contests, and partly because of the manner in which such conventional contests are typically structured, the utility of the data produced by such conventional contests for purposes such as combination forecasting often is sub-optimal.

In the financial and economic arenas, the result is that traditionally there has been insufficient data upon which investors could rely in order to select investment advisors. As a result, many investors are left to select advisors based largely on arbitrary criteria or, in the best case, to rely on recommendations from friends. At the same time, many actual and potential investment advisors who are very capable at reading the market conventionally have had very little opportunity to demonstrate their expertise to the public, and thereby attract new clients. Similar concerns exist for other financial and economic experts who wish to demonstrate their expertise or the validity of their prediction techniques.

What is needed therefore, is a contest in which the rankings and/or rewards are tied more closely to the forecasting characteristics that are most desirable and that yields a large database of information which can serve as the basis for comparing the predictions of different forecasters. It is also desirable that the contest provide data that are statistically significant and can provide the basis for a wide variety of combination forecasts and other statistical analyses as well as being highly useful for marketing purposes.

Prediction Input

In conventional forecasting contests, participants typically submit their predictions by writing, typing or speaking their predictions. Most frequently, such predictions consist of a numerical estimate of what the value of the predicted variable will be at a specified point in time. Thus, for instance, in the www.investorsforecast.com website contest mentioned above, participants type in the values of their estimates and then submit those estimates by clicking a button on the website.

While such prediction submission techniques are adequate for their intended purpose, they suffer from many shortcomings. The following examples of such shortcomings have been identified by the present inventors.

First, such conventional prediction submission techniques frequently are not very intuitive from the participant's point of view. In particular, they often require the participants to digest a significant amount of information in order to translate their rough feelings about the way the prediction variable is likely to move into a hard number. This is a significant disadvantage for those participants who are very intuitive oriented. Moreover, to the extent such persons are prone to errors in processing such data when converting their rough perceptions into a hard number, their submitted predictions may vary from what they actually believe about the subject variable.

Second, having to enter numerical estimates for each prediction variable can be cumbersome and time-consuming. This may have the effect of limiting the number of variables for which participants are willing to submit predictions.

While other prediction submission techniques have been utilized, they typically have had very limited applicability. For example, the website at www.cyberskipper.com permits participants to compete in predicting certain sports-related events. One of the prediction submission techniques utilized by this site is to display a grid of possible events. The participants can then click on a cell within the grid to designate their prediction that a particular event will occur. Thus, a different grid is displayed for each baseball game, with each row of the grid corresponding to a different baseball player and each column corresponding to a different event (e.g., "runs", "hits", home run"). If a participant believes that a certain player will get a home run in a game, he simply clicks on the appropriate cell to enter that prediction. As can be readily appreciated, this technique generally is limited to predicting binary events (i.e., will/will-not occur). In many cases, this deficiency will limit the applicability of such techniques to collection of very coarse predictions.

What is needed, therefore, is a more efficient and intuitive way to enter or submit prediction data that is applicable across a wide range of prediction events and that can permit participants to submit predictions with more specificity than has been available with conventional techniques.

Provision of On-Line Resources

Use of the Internet has become more and more common over the past few years. Similarly, the number of websites on the Internet has grown exponentially and is expected to continue to grow at a fast pace. As a result, the amount of information available on the Internet can be staggering. However, there is often little done to insure that the information provided to end users is the most relevant to those users.

A typical website might contain advertising, as well as a certain amount of content. Both types of information are typically controlled exclusively by the owner of the website, possibly based loosely on some indications as to what visitors would like to see, or based on what advertisers might believe will be most effective. However, the present inventors question how good such strategies are at actually providing website visitors with the information that they actually want and, in any event, have concluded that the effectiveness of such conventional strategies must necessarily vary based on the website owner's individual skill in gauging his audiences desires.

Accordingly, the present inventors have discovered that what is needed is a more systematic technique for providing appropriate resources to users over an electronic network, such as the Internet, that more accurately reflects the users' desires.

Financial and Economic Forecasting

The American economy is made up of the simultaneous activities of hundreds of millions of participants, simultaneously buying and selling goods and services in the competitive economy. Probably the most famous market is the Stock Market for the buying and selling of corporate ownership. Each business day, millions of shares of stock are bought and sold at competitive prices. Prices set by the competitive market change as people obtain different information regarding the availability and demand for goods, services, and financial assets. No individual knows all the market conditions in advance of trying to buy or sell. Knowing what prices will be in the future could allow market participants to change the amounts at which they would otherwise transact (e.g., if prices are expected to increase in the near future, knowledgeable sellers might withhold inventory from the market place).

Almost as long as there have been measurements of economic data, people have attempted to formulate forecasts of prices and economic activity by using a variety of techniques. During the past fifty years, several distinct methodologies for producing economic forecasts have been explored. Some of the most important include large-scale econometric systems, time series methods, computationally intensive techniques, opinion polling, and combination methods.

Economists, mathematicians, and forecasters have spent over a century attempting to specify increasingly complex mathematical and statistical models, which, some believe, could allow accurate forecasting to take place. Beginning with economic and behavioral theory, mathematical equations representing the interactions of different variables with each other are hypothesized. Then, using a sophisticated set of econometric model identification techniques, specific numerical values for the equations' parameters are calculated based on historical relationships and observed data. Examples of these models have included the DRI Model, the Wharton Model, and the UCLA Forecasting Project model. Such large multiple equation mathematical forecasting models of the economy are ever increasingly complex, modeling ever-finer levels of economic detail, but their very complexity often makes them inaccurate as forecasting tools.

Some of these models can be used with fair accuracy to provide "what if" simulations for the economy, simulations beginning from a specific initial set of economic measurements and then computing the likely economic impact from various policy changes (e.g. tax cuts, military spending). However, to the extent that the starting values are not precisely measured, or that there are even ever-so-slight errors in the mathematical equations, the resulting forecasts can display extraordinary deviation from the values that eventually are observed in the economy. These problems are made worse if, for any reason, historical economic data were generated by a different set of relationships than are now found in the economy. In this regard, one wag observed that these models are so accurate, economists have successfully predicted 14 of the last 3 recessions. Even so, these large-scale economic forecasting models remain the "gold standard" for economic forecasting, and millions of dollars are spent each year to purchase forecasts from such systems.

Approximately thirty years ago, a group of econometricians, predominantly of British origin, began to develop alternative economic prediction methods. Foremost, single equation models using "time series" techniques popular in engineering applications were found to out-predict the large multiple equation economic models. The development of straightforward computer programs implementing these forecasting techniques allowed for the rapid development of these single equation forecasting models. Numerous economic variables were found to be reasonably predictable using such techniques. These techniques have continued to advance with the development of more complicated techniques (known by acronyms such as "ARCH" and "GARCH"). However, these forecasting techniques are viewed with some suspicion by many economists and forecasters because they lead to models developed using empirical criteria, not models specified as the logical result of economic theory. Even so, single equation forecasting methods are among the most valuable tools used by technical and quantitative market analysts, and are widely applied by Wall Street "Rocket Scientists" and many practicing business forecasters.

Another set of "Rocket Science" tools has become popular during the 1990s, the "computationally intensive" forecasting tools. Using massive computerized databases, mathematical search algorithms are employed to find "black boxes" for forecasting. Such techniques include "neural networks", large systems of empirically based equations with parameters that evolve over time. Neural networks appear to be used, for example, in creating the forecasts produced by www.forecasts.org. Ideally, neural networks learn from their mistakes and self correct. Although neural networks are the foundation of numerous automated trading and arbitrage systems on Wall Street, in practice they sometimes "learn" too slowly and converge on very localized forecasting rules, which do not generalize well.

Still being developed, but of great interest are the computationally intensive statistical pattern matching procedures. Just as the weather service locates historical weather patterns in their database that look like current weather patterns, and then base long term predictions on what the historical "next week's weather" turned out to be, some forecasters are attempting to match past patterns of economic and stock market data to current conditions to make long term predictions. These forecasters are sometimes referred to as the "Rocket Science Technical Forecasters". However, these techniques are in their infancy and because of sparse historical data may never be of more than limited use in most economic forecasting applications.

In addition, public opinion polls and surveys have been used to forecast "consumer sentiment" measures and to gather data on peoples' consumption patterns. To some extent mirroring the data collection methods used by the government to estimate its official economic measures, these have demonstrated some ability to provide accurate forecasts of what upcoming government statistical releases will say. For instance, the University of Michigan Center for Social Research is identified with its surveyed Index of Consumer Sentiment. Other major public opinion polls also routinely include questions regarding economic conditions.

The final category of forecasts, so-called "consensus forecasts", is similar to opinion-poll surveys but with a key difference. In public opinion polls, random populations are sampled. In creating a consensus forecast, polls and surveys of economic and financial forecasters (and, sometimes, published forecasts) are conducted. Typically, the median value across participants is the consensus forecast. These surveys have proven to be quite good, generally outperforming over time the individual forecasters who are included in the panel underlying the consensus forecast. Consensus forecasts are regularly conducted for corporate earnings, money supply and interest rates, and key macroeconomic variables. For example, both IBES and First Call survey stock analysts to identify expected corporate earnings. MMS surveys bank economists to estimate the money supply figures on the upcoming Federal Reserve H-6 reports. Blue Chip Economic Indicators was perhaps the first service providing median and average forecasts from a group of forecasters for general economic variables (see www.bluechippubs.com). The National Association of Business Economists Forecast Survey provides at least quarterly reports on what its membership anticipates for certain general economic variables. The Federal Reserve conducts similar surveys of about 30 economic forecasters with results published regularly in the financial press.

Consensus forecasts are an example of a broader, but relatively infrequently applied category of "combination forecasts". Combination forecasts are forecasts created from a group of underlying forecasts. Approximately twenty-five years ago, combining forecasts was an active area of econometric research and many theoretical problems were solved, including sophisticated mathematical procedures for determining optimally changing weights for the combinations. Although the consensus forecast median is a combination forecast, median forecasts usually are not the best combination forecasts, given the available data. However, they are "pretty good" combination forecasts, and can be easily calculated.

The consensus forecasts require no historical information about either predictions or accuracy. More sophisticated forecast combinations require a historical track record for each forecast to be included in the combination. Once this track record is available, the forecasts can be analyzed into optimal combinations much like investments are combined into an optimal portfolio.

While consensus forecasting is alive and well, it appears that the broader optimal forecast combination literature has been abandoned or forgotten except, perhaps, in a few academic strongholds. This is not surprising. At the time these theoretical combination techniques were being developed, the efficient market hypothesis was in its prime and stock market forecasts were viewed with great suspicion, if they were considered at all, by academics. Economic forecasts were generally produced on a monthly basis at best, and more often on a quarterly basis. Because virtually all computation was still done on cumbersome mainframe systems, often as overnight batch computation jobs, forecasts were expensive to obtain. Even if a large number of forecasts were available, the optimal combinations could have required more computing power than was readily available to users, just as the Markowitz portfolio problems were generally intractable in practice.

Consequently, the lesson that seemed to be learned from the forecasting combination literature is that people get more accurate predictions if they somehow take an average of forecasts. Hence, demand grew for consensus forecasts based on simple surveys of forecasters, but more advanced combinations were not widely used due to cost, data constraints, and computational complexity. Like many technologies, the optimal forecast combination techniques were developed before the infrastructure was available to allow for their effective implementation.

In addition, combination forecasting can be difficult to implement for a large forecasting panel over a significant period of time, largely because the makeup of the forecasting panel varies over time and because the frequency of participation by the various members of the forecasting panel cannot be adequately controlled.

Still further, in certain cases there may be insufficient forecaster participation to permit a combination forecast of sufficient accuracy. Also, even if an accurate combination forecast is generated for a variable, it may be difficult to say with any certainty what was the relative importance of various factors arriving at the forecast.

Thus, what is needed is a more accurate forecasting methodology that overcomes the above shortcomings in the prior art.

Utilization of Banner Ad Click-Through Information

Many conventional websites include banner advertisements which also function as hyperlinks to the advertiser's website. Thus, if a website visitor is sufficiently interested by the advertisement, he can simply click on the advertisement to retrieve the advertiser's webpage and obtain more information about the particular product or service. Use of such banner advertisements can provide advertising revenue for the displaying website and additional exposure for the advertising company.

In order to better target their advertising efforts, such advertisers might keep track of how many visitors to their site resulted from click-throughs for each of the various banner ads they have posted on others' websites. However, the present inventors have discovered that banner ad click-through information can be used in a wide variety of additional applications, such as further increasing the efficiency of advertisers' marketing efforts, predicting certain events, and others.

SUMMARY OF THE INVENTION

The present invention addresses the foregoing problems by providing a number of different inventive features which can be implemented individually or in any of a wide variety of combinations. These inventive features generally can be grouped according to the following categories.

Forecasting Contest

The present invention provides forecasting contests that include features directed to better ranking of the participants and/or that result in a better database of prediction data.

Thus, in one aspect, the invention is directed to conducting a contest that produces forecasting data for predesignated variables whose values change over time. Initially, participant registrations are accepted, and the participants are permitted to submit predictions of values, projected at plural different time points, for at least one of several predesignated variables. For example, an individual participant might elect to predict what the exchange rate between the U.S. Dollar and the Japanese Yen will be at the end of next week and at the end of the year. Then, the participants receive an overall ranking based on their relative accuracies (e.g., percentile rankings) in individual prediction events.

By ranking individuals based on their relative accuracies in individual prediction events, a contest conducted according to this aspect of the invention permits an overall ranking within a group of participants even though the participants in the group might be predicting different combinations of variables or might be predicting for different time horizons. At the same time, ranking based on performance in a number of different prediction events often can provide more meaningful rankings, for example, by eliminating many of the incentives to engage in strategies that may occasionally provide high rankings in individual prediction events. For instance, in conventional contests that rank based on accuracy in individual prediction events and recognition is given only to the top performers, a participant might have a strategic incentive to predict relatively unlikely values rather than values that he actually expects to occur so that occasionally he will be correct and will be listed as a top forecaster, rather than always ranking near the middle.

In another aspect, the invention is directed to conducting a contest that produces forecasting data for predesignated variables whose values change over time. Participant registrations are accepted, but in this aspect of the invention registration by a participant requires providing information regarding demographic characteristics of the participant. Participants are then permitted to submit predictions of values, projected at plural different time points, for at least one of certain predesignated variables. Finally, the participants are ranked based on their track records over a pre-defined period of time. In this aspect of the invention, the predesignated variables include economic and/or financial variables, and participants are rewarded for updating their predictions as early as possible.

By requiring demographic information as a condition to registration, this aspect of the invention can often create a more useful database of prediction data for purposes such as combination forecasting. Also, rewarding participants for updating their predictions as early as possible can provide a fuller, more complete and more continuous database. Finally, as noted above, by ranking based on track record over a pre-determined period of time, single-event strategies often can be largely eliminated.

In another aspect, the invention is directed to conducting a contest that produces forecasting data for predesignated variables whose values change over time. Participant registrations are accepted, with participant registration including providing information regarding personal characteristics of the participant. The participants are permitted to submit predictions of values, projected at plural different time points, for at least one of certain predesignated variables, including economic and/or financial variables. Then, the participants are ranked based on their track records over a predefined period of time. This ranking includes: (1) determining, for each participant and for each of plural prediction events in which the participant competed, a percentile rank in comparison to other participants who competed in the prediction event; (2) combining the percentile ranks for each participant to produce a raw score for the participant; and (3) ranking the participants based on the raw score for each participant.

The ranking technique utilized in this aspect of the invention can be systematic and automatically implemented, while maintaining the above-described advantages of providing an overall ranking based on relative accuracies in individual prediction events.

In a still further aspect, the invention is directed to conducting a contest that produces forecasting data for predesignated variables whose values change over time. Participant registrations are accepted, and the participants are permitted to submit predictions of values, projected at plural different time points, for at least one of certain predesignated variables. The participants then receive an overall ranking based on their track record over a pre-defined period of time and based on consistency of their accuracies in individual prediction events.

By basing overall ranking on accuracy consistency in individual prediction events, as well as on track record, this aspect of the invention can often provide better ranking information than conventional ranking techniques permit. For example, in the investment arena an important quality in judging the merit of an investment advisor will often be consistency, as inconsistency typically translates directly into higher risk. Thus, by ranking based on a combination of accuracy and consistency, this aspect of the present invention can often provide a ranking that is typically more meaningful to third parties, such as investors.

In a still further aspect, the invention is directed to conducting a contest that produces forecasting data for predesignated variables whose values change over time. Participant registrations are accepted, and the participants are permitted to submit predictions in plural different prediction events, each prediction event having a closing time point by which final predictions must be submitted. Then, an overall ranking of the participants is determined based on the participants' track records in the prediction events over a pre-defined period of time and based on how soon their final predictions were made before the closing time points.

By basing the overall ranking on how soon the participants' final predictions were made before certain closing time points, as described above, this aspect of the invention often encourages earlier predictions and more frequent prediction updates, thereby providing a more complete database of prediction data. At the same time, participants are rewarded for discovering and/or incorporating new information into their predictions at the earliest possible time, with the result that the both quality of the prediction data and the quality of the rankings are likely enhanced.

In a still further aspect, the invention is directed to conducting a contest that produces forecasting data for predesignated variables whose values change over time. Participant registrations are accepted, and the participants are permitted to submit predictions of values, projected at plural different time points, for at least one of certain predesignated variables. The participants also are permitted to submit estimates of their own uncertainty regarding their predictions.

By permitting participants to submit estimates of their own prediction uncertainty in the foregoing manner, participants often are encouraged to participate more frequently, even if they are somewhat less certain regarding their predictions. As a result, more data are collected. At the same time, the additional uncertainty data enhances the prediction data database, thus frequently permitting more accurate combination forecasts, more accurate determination of other statistical indicators, and even creation of additional statistical measures, all toward the end of more accurately gauging the sentiments of the forecasting panel.

Prediction Input

The invention also addresses the above-mentioned problems in the prior art by permitting users to enter predictions graphically.

Thus, in one aspect the invention is directed to facilitating the entry of prediction data. Initially, a graph is electronically displayed, the graph including a historical portion that includes historical values of the variable over time and also including a future portion. Then, a participant is permitted to designate a point on the future portion of the graph (e.g., by using an input device such as a mouse, a touch-sensitive display screen or the like) and the designated point is converted into a predicted value for the variable at a realization time.

In another aspect, the invention is directed to a method for entering prediction data for a variable. Initially, a participant causes a graph to be electronically displayed, the graph including a historical portion that includes historical values of the variable over time and also including a future portion. Next, the participant designates a point on the future portion of the graph, the position of the point corresponding to the predicted value for the variable at a particular realization time and also corresponding to the realization time itself. For instance, the horizontal position of the point might correspond to the realization time while the vertical position of the point corresponds to the predicted value. Finally, the participant enters the predicted value, such as by clicking on an "enter" button.

By allowing a participant to see a graphical depiction of historical values for a prediction variable and then to enter a prediction value for the variable in the foregoing manner, the present invention can offer a more intuitive way to enter prediction values than has been available in the prior art techniques. In addition, the foregoing technique can permit a participant to observe and evaluate a significant amount of information at the same time that he is entering his prediction.

Additional features of the invention include: also displaying on the same graph historical values for other variables; providing the ability to display the historical data and/or the predicted value for the prediction variable with respect to a different independent variable than in the initial graph; displaying multiple variables on an initial graph in a first view (e.g., a time series view) and then permitting the participant to obtain a view that is a rotation of the first view (e.g., a cross-maturity comparison view); permitting the participant to numerically alter the prediction after it has been entered graphically; permitting the participant to alternatively bypass the graphical input altogether and instead enter the prediction numerically; permitting the participant to enter, in addition to his prediction, an estimate of his own uncertainty regarding his prediction; permitting the participant to graph only certain ranges specified by the participant; permitting the participant to change scales of the graph; permitting the participant to obtain graphs of arbitrarily requested mathematical transformations of historical and/or prediction data; permitting the participant to alter his predictions based on any of the foregoing different views, and even from within any or all of the different views; linking historical and/or current data, news, publications, etc. to the cursor position as it moves across the graph, so that such information is easily and conveniently available to the participant; and, lastly, matching the participant's prediction(s) to different prediction models to find the closest model, and thereafter providing the participant with information regarding the model, such as the type of model, the implied assumptions in the participant's prediction(s), and the amount of weight the participant is implicitly applying to different items or pieces of information that underlie the identified forecasting model.

Any or all of the foregoing features can be included in the prediction input techniques of the present invention. All enhance the basic prediction input technique described above by providing the participant with a wide variety of different types of data in any of a wide variety of different formats, thus permitting each individual participant to obtain the data that are most useful to him and to display such data in the format(s) that are most useful to him.

Community-Selected Content

The present invention also addresses the above-described problems of providing the most useful content over an electronic network, such as the Internet. Generally speaking this problem is addressed in the present invention by providing a systematic technique for allowing users to participate in determining what content is most useful to them.

Thus, according to one aspect, the invention maintains a collection of resources that can be accessed by a participant over the electronic network (such as the Internet) at a given time and, typically upon request, provides such resources to the participant over the electronic network. Points are assigned to each resource based on participant access of the resource and the collection is modified based on the points assigned to each resource. For instance, a fixed number of points may be assigned to each resource when a participant accesses the resource and the resources having the worst overall rating based on assigned points may be removed from the collection. Alternatively, a resource may be moved from the initial collection and placed in a second collection when its number of points has reached a certain predetermined criterion (e.g., a fixed number or a fixed number within a set period of time).

By assigning points and modifying the collection in the foregoing manner, the present invention can provide a systematic and automatic technique for updating a collection of resources over an electronic network, such as the Internet. In a more particularized aspect of the invention, the number of points assigned to a resource when a participant accesses the resource is based upon the participation level of the participant. In this way, the participants who are most active on the network can have the greatest impact on the resource collection.

In another particularized aspect of the invention, each resource is assigned a score based on the points assigned to the resource, with points assigned more recently being weighted more heavily in determining the score than points assigned less recently. In this way, it can be possible to properly maintain the collection even in the presence of changing tastes or changing consumer needs.

In a further aspect, the invention is directed to providing information to participants over an electronic network by maintaining a collection of resources. Participants are permitted to rate the resources and points are assigned to each resource based on participant rating of the resource. The collection of resources is then modified based on assigned points for each resource.

In the foregoing manner, participants have the ability to directly assess the usefulness of any particular resource to them and these assessments are utilized to modify the collection. This can have the effect of making the resource collection even more responsive to the needs of the participants (or users) because, although a resource might initially appear to be valuable, upon closer inspection a user might find it to be inaccurate, poorly organized or lacking for any other reason. Thus, allowing participant ratings and the utilization of those ratings in the foregoing manner often will account for such problems.

In a still further aspect, the invention is directed to providing information to participants over an electronic network by maintaining a collection of resources. Participants are permitted to both access and rate the resources, with points assigned to each resource based on such ratings and access. The collection of resources is then modified based on total points for each resource.

By combining point assignments based on both ratings and access, this aspect of the invention often typically can provide all of the benefits described above.

Combination Forecasting Using Clusterization

The present invention addresses the problems with attempting to use combination forecasting in certain cases (such as where membership of the forecasting panel is inconsistent) by using clusterization techniques.

Thus, in one aspect, the invention is directed to providing combination forecasts using predictions obtained from a group of forecasters. The forecasters are first divided into a number of pre-defined clusters, which typically will have been formed using statistical clustering techniques. In particular, clusters of forecasters can be formed based on similarities of the forecasters' predictions. Then, statistical data are calculated for each pre-defined cluster (e.g., measures of central tendency and dispersion). Finally, the statistical data for all the pre-defined clusters are combined so as to obtain a combination forecast.

By utilizing clustering in the foregoing manner, the present invention often can avoid the difficulties of inconsistent forecaster participation. For instance, by utilizing cluster statistics, it often will much less significant whether or not any particular individual submits a forecast for a given prediction event.

The foregoing steps can be repeated for each new prediction event. For example, after an initial clustering with respect to a given prediction variable, each time it is desired to generate a new combination forecast for that prediction variable, the currently participating forecasters can be simply assigned to their previously identified clusters and then new cluster statistics can be determined and combined.

When generating the combination forecast, it is generally preferable to weight the central tendency for each cluster based on its dispersion measure (e.g., more tightly clustered predictions given more weight than less tightly clustered predictions) and/or based on the cluster's previous prediction accuracy (e.g., clusters having historically better prediction accuracies are given more weight).

It is also preferable to periodically re-cluster the forecasters to obtain a new set of pre-defined clusters. This often will be desirable to take account of shifting demographics, attitudes, social climates, economic conditions, and similar matters.

More particularized aspects of the invention also include identifying an assignment formula for assigning each new forecaster to a pre-defined cluster based on personal characteristics of the new forecaster. This feature of the invention can permit additions of new forecasters in between re-clusterizations.

Forecasting Using Interpolation Modeling

The present invention also addresses the problems of predicting variables for which there is insufficient forecaster participation and parsing changes in the value of a variable to determine the relative impact of various factors on the change.

Thus, in one aspect, the invention is directed to predicting a value of a target variable based on predictions of other variables. This aspect of the invention involves obtaining historical values for the target variable at each of several time points and obtaining previously predicted values and currently predicted values for each of several predictor variables, the predictor variables being different from the target variable. Values are assigned to parameters of a forecasting model to obtain the best fit of the previously predicted values for the predictor variables to the historical values for the target variable. Finally, a value of the target variable is predicted from the currently predicted values for at least a subset of the predictor variables using the forecasting model and the values assigned to the parameters of the forecasting model.

By using predictions of other variables in the foregoing manner, the present invention is often able to predict a value for a target variable for which there is insufficient forecaster participation. For example, there might be insufficient forecasters to produce a good combination forecast for the share price of a thinly traded stock. However, using predictions of other similar stocks in the foregoing manner, a fairly good forecast for the share price of such a stock often will still be possible.

Moreover, even when there is sufficient forecaster participation, the prediction for the target variable produced in the foregoing manner can be compared to realized values of the target variable and to other predictions of the target variable (such as a combination forecast) in order to sort out the influences of different factors. This advantage is often very helpful in assessing the impact of similar factors in the future. For example, calculating the difference between the value of the target variable predicted in the above manner and the actual value realized for the target variable typically will provide a measure of information that is specific to the target variable. Similarly, calculating the difference between the value of the target variable predicted in the foregoing manner and the value predicted for the target variable using a combination forecasting technique typically will provide an estimate of expected information that is specific to the target variable.

Pricing Derivative Instruments

The present invention also provides a novel technique for pricing derivative instruments by using forecast data.

Thus, in one aspect, the present invention is directed to pricing a derivative instrument whose value is dependent upon the value of an underlying asset at a future date. For each of a number of predetermined different prices, the value of a derivative instrument is calculated if the underlying asset were to be priced at that price on a future date. A number of individual forecasts of the value of the underlying asset on the future date are obtained. A probability is determined for each price, from the number of predetermined different prices of the underlying asset, as the proportion of individual forecasts that were closer to that price than to any other of the predetermined different prices. Finally, the derivative instrument is priced based on the values calculated for the derivative instrument above and based on the probabilities determined above. Preferably, the derivative instrument is priced as the sum, over the number of predetermined different prices, of the value identified above for the derivative instrument if the underlying asset were priced at a given price on the future date, times the probability determined above for that given price.

By virtue of the foregoing technique, a price can be determined for a derivative instrument, often without the need to assume a particular shape of the probability density function for the value of the underlying asset and without having to rely on historical variances, which are often poor indicators of future variances.

The foregoing technique can also be repeated for multiple time points within the period during which rights under the derivative instrument may be exercised. The resulting multiple different prices can then be combined, such as by taking a maximum of such prices, or in various other manners, to determine a final price for the derivative instrument.

Utilization of Banner Ad Click-Through Information

The present invention provides the following novel techniques for utilizing banner ad click-through information to predict values of variables and to manage the display of banner ads.

In one aspect, the invention is directed to forecasting values for a variable by obtaining click-through data (e.g., click-through rates or changes in click-through rates) for website banner advertisements. Initially, a forecasting model is created for a variable (e.g., using a regression technique to create a linear or non-linear forecasting model), based on correlations of historical values of the click-through data with historical values of the variable. Then, the forecasting model is used to predict a future value of the variable.

In the foregoing manner, click-through data can often be used to predict a variable. For example, it may be possible to more accurately predict new housing starts in part based on the click-through rate for a particular mortgage advertisement.

In more particularized aspects of the invention, the website banner advertisements may be sorted into groups by categorizing them according to product/service advertised. Utilizing statistics for each such group may provide continuity while at the same time lessening the effects of changing advertisements. Thus, for example, new housing starts may be predicted based on the click-through rates for all mortgage advertisements.

In a further aspect, the invention is directed to displaying website banner advertisements. The displayed website banner advertisements are sorted into categories based on product/service sold. An individual click-through rate is determined for each website banner advertisement and an aggregate click-through rate is determined for each category. Then, which website banner advertisements are displayed is changed based on a comparison between information pertaining to the individual click-through rate for a selected website banner advertisement and information pertaining to the aggregate click-through rate for the category to which the selected website banner advertisement belongs.

The foregoing technique often can permit the display of more effective website banner advertisements. For example, if the click-through rate for a particular mortgage advertisement is significantly less than the click-through rate for all mortgage advertisements, that particular mortgage advertisement may need to be modified or replaced.

Comments Regarding Summary

The foregoing summary is intended merely to provide a quick understanding of the general nature of the present invention. A more complete understanding of the invention can only be obtained by reference to the following detailed description of the preferred embodiments in connection with the accompanying drawings.

BRIEF DESCRIPTION OF THE DRAWINGS

FIG. 3 illustrates a "Library" page of a forecasting contest according to a representative embodiment of the invention.

DESCRIPTION OF THE PREFERRED EMBODIMENTS

Figure 1:
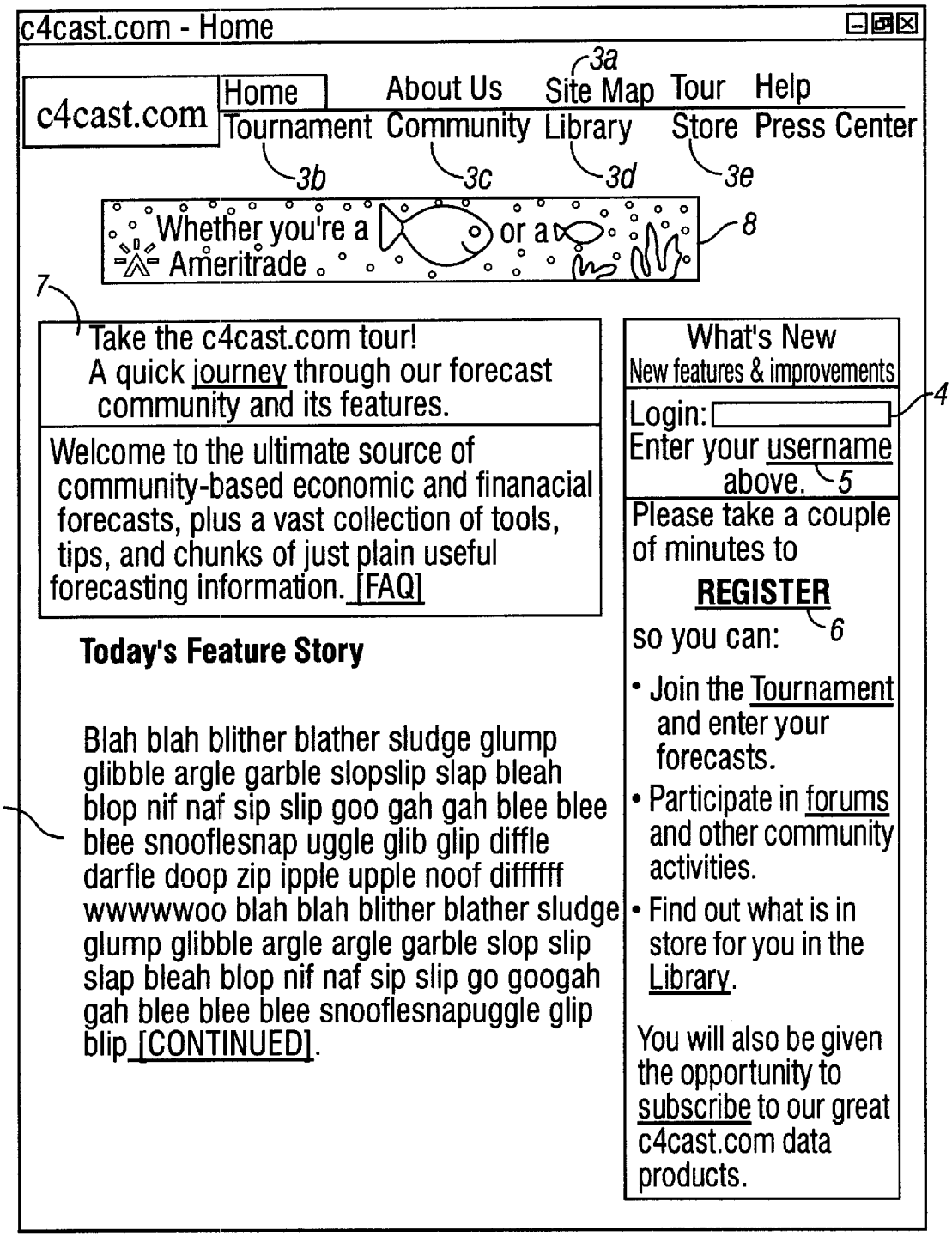
FIG. 1 illustrates the home page of a forecasting contest according to a representative embodiment of the invention.

In the preferred embodiment of the present invention, participants from the general population register for and then compete in a forecasting contest. Preferably, the contest is conducted over an electronic network, such as the Internet, which provides immediate access to the general population. It is also preferable that the contest is structured not as a single contest, but rather as a collection of different competitions (or challenges) in which participants may elect to participate. As discussed in more detail below, these challenges may be either mutually exclusive or may overlap to some extent. Generally speaking, in the preferred embodiment of the invention participants are ranked and/or rewarded based on their track records over a period of time in each of the different challenges in which they participate, as well as on how well they do in predicting values for certain individual variables (e.g., individual stock or commodity prices) and how well they do in different time frames (e.g., short term, medium term, long term) both for the challenges and for the individual variables. This flexibility in permitting participants to select which individual variables to predict, which challenges to enter, and for which time frames predictions will be submitted often can permit identification of the best forecasters in well focused categories.

As described in detail below, this contest structure also encourages participants to make the most accurate predictions possible, resulting in a highly valuable database of forecasts. These data can then be processed in a number of different ways to produce useful forecast information.

In order to facilitate predictions, participants preferably are provided with a variety of resources, such as Soapboxes, Archives, a "dumpster" and chat rooms, all as described in more detail below. The invention includes novel community-selection aspects which attempt to insure that the most relevant resources are made available. The invention also includes novel features for facilitating the entering of prediction data and for processing the prediction data to obtain more comprehensive combination forecasting information that is less sensitive to variations in individual participation. Finally, the invention also provides a number of novel techniques for utilizing banner ad click-through information. Thus, the invention includes a number of inventive features, and those features may be implemented individually or in any of a number of different combinations. These various features are discussed in detail below.

The Forecasting Contest

The forecasting contest according to the present invention preferably is conducted over an electronic network. More preferably, the contest is conducted over the Internet. However, other electronic networks might be used instead of or in combination with the Internet. For example, participants might be permitted to enter predictions either via the Internet or via an ordinary touch tone telephone, using a telephone voice response system. Similarly, participants might enter predictions and access the other available information via an intranet and/or other local area or wide area networks.

FIGS. 1 to 4 illustrate how a website implementing such a contest might be structured according to a representative embodiment of the invention. Specifically, FIG. 1 illustrates a representative website homepage 2 for the contest. At the top of homepage 2 are a number of links, such as links 3a to 3e, to other pages of the website. Existing participants can log into their accounts by typing their usernames into text field 4 and then clicking username button 5; optionally, the accounts may be password protected so that login would require entering both a username and a password. New participants can register for the contest (as described in detail below) by clicking on the register button 6, which would pull up a registration webpage on which the user would enter required and optional registration information, and indicate the desired subscription level. As shown in FIG. 1, homepage 2 also includes a link 7 to a site tour, the feature story of the day, and a banner advertisement 8, which typically will function as a hyperlink to the advertiser.

Figure 2:
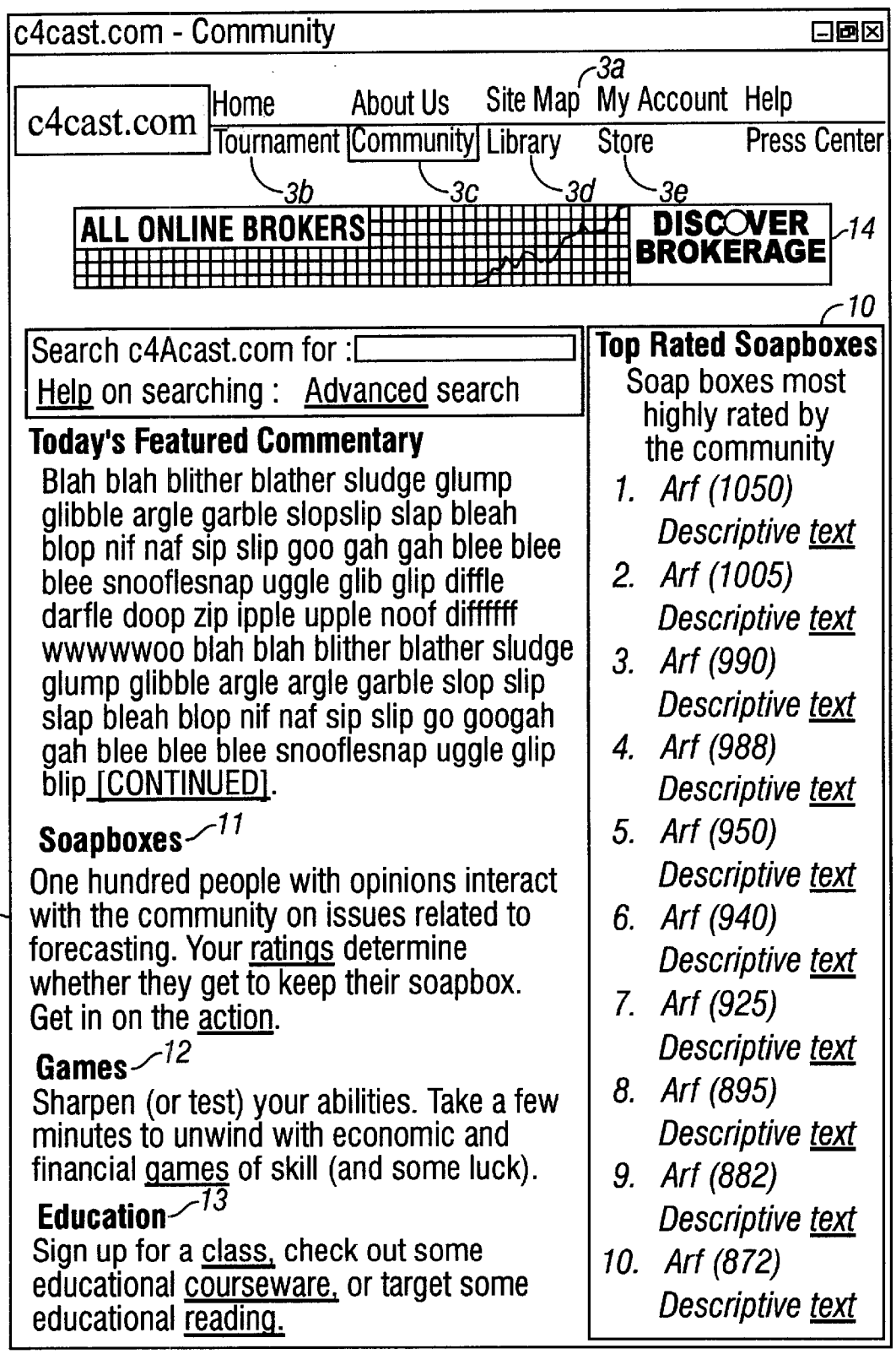
FIG. 2 illustrates a "Community" page of a forecasting contest according to a representative embodiment of the invention.

Clicking on link 3c pulls up the Community page 9 of the websites, which is shown in FIG. 2. This page of the site includes information primarily about the interactive informational content of the website. For example, portion 10 of the page includes links to the top 10 rated Soapboxes (as described below). In addition, clicking on link 11 pulls up a web page listing all of the Soapboxes with a brief description of each. Clicking on link 12 pulls up a web page listing available interactive games related to the subject matter of the contest. Clicking on link 13 pulls up a page describing and linking to educational classes and educational materials related to the subject matter of the contest that are available. A different banner ad 14 is displayed at the top of Community page 9.

Figure 3:
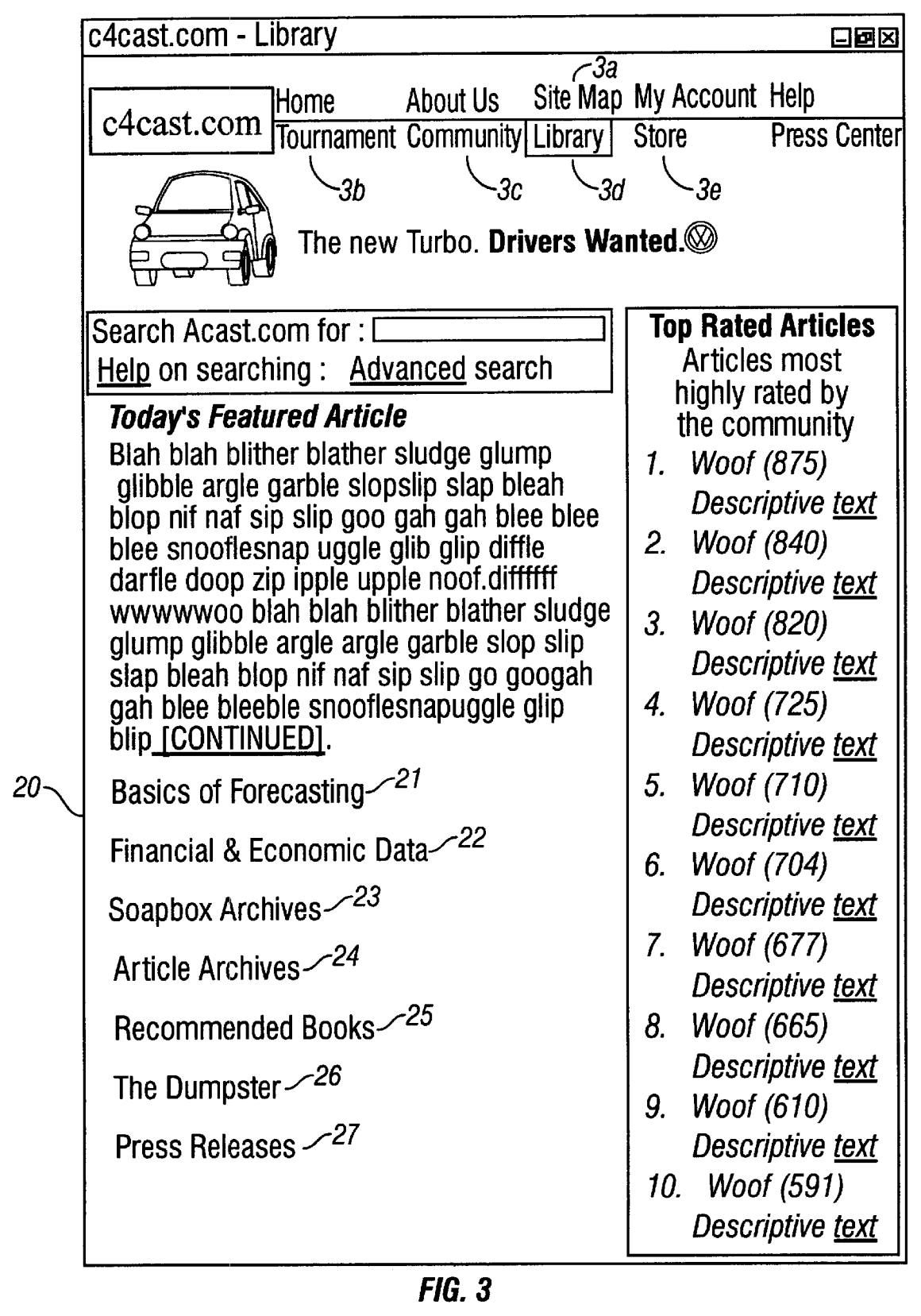

FIG. 3 illustrates the Library page of the contest website. This page of the site includes information primarily about the non-interactive informational content of the website. Thus, included are links to: written materials on the basics of forecasting 21, historical financial and economic data 22, archives of materials sponsored by the Soapbox Proprietors 23, archives of articles 24, a list of recommended books 25 related to the subject matter of the contest, dumpster materials 26 (as described below), and press releases 27 related to the subject matter of the contest. Although the foregoing material itself is largely interactive, upon linking to the pages concerning such material, participants preferably have the ability to perform certain interactive functions, such as: searching for specific materials according to a variety of different criteria; keyword searching; and organizing and displaying financial and economic data in a variety of different formats (e.g., various geographical and/or tabular formats). Certain of these features are described in more detail below.

Figure 4:
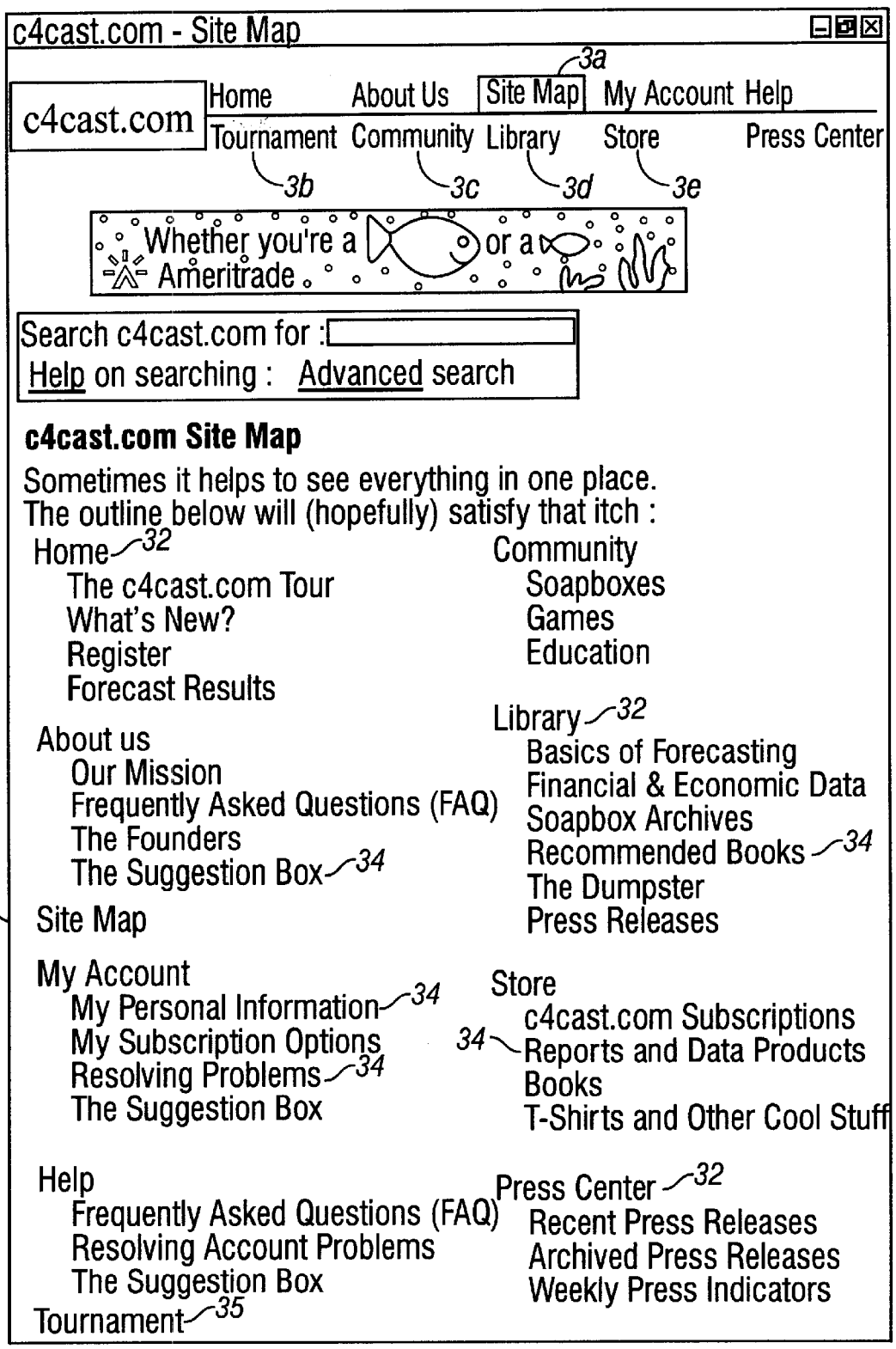
FIG. 4 illustrates a web page providing a site map of a website for a forecasting contest according to a representative embodiment of the invention.

Finally, FIG. 4 illustrates the site map page 30 of the contest website. Specifically, this page illustrates a high-level (e.g., first and second levels only) site plan for the contest website. The first level links, such as links 32, are the same links that are displayed at the top of the homepage 2. The second level links, such as links 34 are to the primary links included in the first level pages. The site plan could also show deeper levels of the website, but two levels is believed to be sufficient to give the user an overview of the site without providing too many details, which might be confusing to the participant.

The Tournament page of the website, which can be reached from link 3b or from link 35, for example, allows the participant to submit prediction values, view historical data, view their own previous prediction values, or views other participants' prediction data, all as described in more detail below.

In the preferred embodiment of the invention, the contest is open to the general public. As used herein, the term "general public" does not preclude certain relatively minor limitations, such as excluding: individuals under 18 years of age, individuals who cannot provide valid identification (such as a credit card number or e-mail address), or individuals or entities who cannot or will not pay to enter the contest. However, subject to such relatively minor limitations, the term "general public" is intended to encompass a wide segment of the population. By opening the contest to the general public, the present invention can collect a qualitatively, as well as quantitatively, different set of data than is the case with many conventional forecasting contests which limit participants to only a small group of "experts" in the field, such as conventional contests which limit participation only to large stock brokerages.

However, it should be understood that the contest is not necessarily limited only to members of the general population. Rather, contests according to the invention may also be conducted for smaller and/or more focused groups of participants. In fact, in certain cases it may be preferable to limit participation in a particular contest only to members of a certain group, firm, club or trade association.

It is also preferable that the actual participants in the contest are self-selected, rather than individually invited to participate. Thus, in the preferred embodiment of the invention, an individual or entity (hereafter, "person") that wishes to participate in the contest merely logs onto the contest website and registers. As indicated above, as part of the registration process the person might be required to provide certain minimal qualification information and/or may be required to pay a fee to participate (such as by providing credit card information over a secure connection). Upon verification of such qualification information, the person is then eligible to participate.

Registration to participate in the contest preferably also requires the potential participant to provide certain information regarding personal characteristics of the potential participant, such as: occupation, age, place of residence, income, highest level of education obtained, schools attended, avocational interests, the dollar value of the potential participant's personal investment portfolio, the dollar value of the investment portfolio managed by the potential participant on behalf of third parties, trading frequency, other information relating to trading behavior, and/or various other demographic or personal information. In addition, some portion of the foregoing information may be required as a condition to registration while other information may be optionally provided by the potential participant. Potential participants may also be encouraged to provide the optional information by providing economic incentives. Such incentives may take the form of cash, merchandise, cash credits (hereafter, "cBucks") which can only be used to purchase services, information or merchandise from the entity conducting the contest or from other entities that are pre-approved by the entity conducting the contest, or anything else of value.

Although it is contemplated that both individuals and entities maybe permitted to participate in the contest, it might also be preferable to limit participation only to individuals, in order to be able to identify the true source of each prediction and to insure that each source remains the same over time. Thus, for example, the track record of a manager for a certain mutual fund could follow him even if he moved to a different fund. This may be more desirable than allowing a prediction from the mutual fund as an entity, in which case the actual individual providing the predictions may vary over time.

Preferably, the contest allows participants to select and predict a number (more preferably, any number) of variables from among a set of predesignated variables. In the preferred embodiment of the invention, these predesignated variables have values that vary over time so that the values of those variables at a number of different points in time can be predicted. More preferably, the predesignated variables pertain to various financial and/or economic quantities, such as the price of a particular stock, the Dow Jones Industrial Average (DJIA), a commodity's price, the unemployment rate, the Consumer Price Index, Gross Domestic Product, the trade surplus/deficit, a particular interest rate benchmark, or a currency exchange rate.

In the preferred embodiment, the contest also is tailored to specific groups of participants by allowing participants to participate in more focused games within the overall contest. These focused games are referred to herein as "challenges", and may be available to all participants, or some or all of the challenges may only be available to those having a minimum subscription level (e.g., only paying participants). For example, the contest might include one or more of the following challenges, with the predesignated prediction variables for each challenge indicated.

Stock Market Challenge

Dow Jones Industrial Average
Standard and Poor's 500 Index
NASDAQ Index
Wilshire 5000 Index
Share price of Magellan Fund Macroeconomic Challenge Percentage Increase in Gross National Product
Percentage Increase in Consumer Price Index (CPI-U)
M3 money supply
Unemployment Rate
New Housing Starts Treasury Yield Curve Challenge 3-month treasury bill rate
One-year treasury bill rate
Five-year treasury note rate
Ten-year treasury note rate
Thirty-year treasury bond rate International Challenge EAFE Index (or Dow Jones World Index)
Dollar/Yen exchange rate
Dollar/Euro exchange rate
LIBOR Eurodollar rate
Nikkei 225 (or Pacific Region Index (excluding Japan))

Commodity Challenge

Gold price
Sweet Light Crude Oil price
Spring Wheat price
Corn price
Coffee price Option Challenge (note: the five dates are within the next six months)

Yahoo 150 Jan Call (and each week a different stock option)
CBOE Dow Jones Industrial Average
Pacific (PSE) Technology
CBOE S&P 500 Index
CBOE Nikkei Long-term Challenge (this Challenge Preferably is Run Monthly for Forecasts: Six Months from Now, Year-end from Now, Two Year-ends from Now, Three Year-ends from Now, and Five Year-ends from Now)

Dow Jones Industrial Average
NASDAQ

Ten-year treasury note rate
Sweet Light Crude Oil price
EAFE Index (or Dow Jones World Index)

Open Challenge (the Five Measures will be Selected from the Other Challenges)

Dow Jones Industrial Average
Gold price
Nikkei 225 (or Pacific Region Index (excluding Japan)
Ten-year treasury note rate
Yahoo 150 Jan Call (and each week a different stock option)

Within each challenge, a participant preferably may predict any number of the variables indicated. However, as will become apparent below, in order to be highly ranked within a particular challenge it may be necessary to predict as many of the variables within the challenge as is possible. However, as the rules of the contest preferably also contemplate ranking many or all of the variables individually, a participant might only care about his rank with respect to individual variables, but not about his rank within any challenge. Thus, for example, a participant might not care about his rank in the Stock Market Challenge, but might care very much about his rank as a predictor of the DJIA, and therefore would only predict that variable. In the preferred embodiment, participants may participate in as many challenges as they desire and may predict as many individual variables as they desire.

Also, it is preferable that each participant be given the opportunity to predict at least some of the variables at a number of different time horizons. For example, participants in the Stock Market Challenges might have the options of predicting the variables included in that challenge for their closing value at the end of next week, 4 weeks from the end of next week, 13 weeks from the end of next week, 52 weeks from the end of next week, year-end, and/or end of next year. Preferably, participants may predict, for each variable, values for as many of the available time frames as they desire.

Also in the preferred embodiment of the invention, participants may enter and revise their predictions as frequently as they like. In fact, providing new predictions and revising those predictions as early as possible are encouraged with incentives. This differs from many conventional contests (such as the contests at www.eas.purdue.edu/forecast and www.PredictIt.com) and provides the advantage that the prediction database resulting from the contest becomes more heavily populated and tends to include predictions that are updated or newly submitted more or less continuously, rather than mainly at discrete points in time. The resulting database can often be more useful for combination forecasts, as well as for other purposes of statistical analysis.

However, at certain time points the predictions become locked and no further changes can be made for the current prediction event. Thus, for example, consider the case in which participants are asked to predict each day what the value of a financial variable, such as the DJIA, will be at the end of next week. In this case, a different prediction event occurs each day for that variable. Assume further that the contest is structured such that the closing time point for each such prediction event is 6:00 p.m. Los Angeles time. In this example, participants would be able to predict the value of the variable and then adjust their predictions throughout the day, but at 6:00 p.m. Los Angeles time, all of the predictions become locked. Thereafter, any new predictions or changes in predictions will not be given effect for the current day's prediction event, but instead will only be given effect for the prediction events ending at 6:00 p.m. Los Angeles time for subsequent days. All of the locked-in predictions for the current day's prediction event will then be compared upon realization of the variable's true value as of the end of the applicable time horizon (e.g., the end of next week). The foregoing rules are then applied to each day's prediction event.

In the foregoing example, only one variable and one time frame was considered. It is more preferable that participants be given the opportunity to predict many different variables and for multiple time frames. In this regard, the closing time point for each variable might occur each day at exactly the same time. However, it should be noted that closing time points for each variable might instead be assigned either arbitrarily, in a manner so as to optimize the frequency or quality of prediction data, based on empirical results, or in any other manner. In particular, it is noted that using a fixed closing time point for all variables might be simpler from the participants' point of view, but might create trafficking problems just before the common closing time point. Also, it might be determined, for example, that for certain variables it is best to set closing time points every other day or every week, rather than every day. Still further, it might be best to adjust closing time points so as to occur some minimum amount of time after the applicable markets close or to schedule the closing time points based on expected public announcements.

It is noted that where closing time points occur periodically (such as each day), the realization time can either be fixed (e.g., the end of next week will be the same for seven consecutive closing time points) or rolling (e.g., one month from today will be different for each closing time point). In the former case, participants generally will be predicting what the value will be at the same realization time. In the latter case, each participant will effectively select his own realization time, which will be determined based on the date and time that his prediction is made. This latter case may also be extended further by allowing each participant to set his own realization time point for each prediction made; for example, participants might, in addition to submitting a prediction, also specify when he expects that prediction to be valid (e.g., 3:00 p.m. on next Thursday). Also, in either case the contest might instead be conducted without closing time points at all, but rather so as to permit each participant to decide for himself the time point at which his prediction will be deemed effective; generally, this time point most likely would be when the prediction is actually submitted.

In the preferred embodiment of the invention, predictions are held over from one prediction event to another until updated by the participant. Thus, in the example given above, a prediction made on Monday morning, if not otherwise adjusted during the day, would be used for the closing time point on Monday. If still not adjusted on Tuesday, the same prediction would be used for the closing time on Tuesday, and so on.

In addition to individual participation, participants preferably are divided into groups based on the participants' interests, occupation or other personal characteristic information provided pursuant to the registration process. For ease of discussion these groups are referred to herein as "Universes". Accordingly, participants may be ranked only against other members of their Universe, only against all other participants, or may be ranked within their Universe as well as overall. Examples of Universes might include Stock Brokers, Soccer Moms, Students, College Professors, Wall Street Analysts, Journalists, and Government Economists. It may also be preferable to assign participants to sub-groups (which may be referred to as "teams") within each Universe or across Universes. Such team assignments may be made randomly, on a first-come-first-served basis (e.g., the first 50 registrants in the Universe are assigned to Team 1, the next 50 to Team 2, etc.), by self-selection among the participants, or on any other basis. Each participant participating in a Universe preferably also is asked for information and permission to notify the appropriate local news media if the participant is identified as one of the top forecasters in that Universe or other grouping.

Participants may also be given the opportunity to join "clubs". If the clubs are constrained to include only members of the same Universe, then the clubs are types of teams. However, this constraint is not essential. Each club may have its own chat room and/or other venues for interacting. Clubs may then be ranked against other clubs and/or rewarded based on their performances. Similarly, individual club participants may be rewarded based on the performance of their clubs.

In addition to predicting actual values for certain predesignated variables, participants may also be asked to provide indicators concerning values for certain variables. For instance, one question might be whether the DJIA will be up or down (an up/down indicator) when comparing tomorrow's close to today's close (or to the value as of the time the prediction is entered). Furthermore, the usual contest predictions might be supplemented by providing various survey questions throughout the day.

One embodiment which utilizes such additional survey questions is as follows. Participants submitting predictions are given chances to participate in a Special Challenge, where the number of chances is related to the number of predictions submitted and/or to the number of prediction updates submitted. Then, participants are randomly selected to participate in the Special Challenge, with the probability of any given participant being selected being equal to (the number of chances held by the participant)*(the total number of participants to be selected for the Special Challenge)/(the total number of outstanding chances). The highest ranking participants in the Special Challenge are then rewarded. This embodiment provides additional incentives for participants to provide and update their predictions as early as possible and also provides the entity conducting the contest with the opportunity to elicit different information over time. Such flexibility can permit the contest promoters to test-market questions for permanent use, to obtain highly focused and/or time-specific information, and/or to gather valuable marketing data.

Other techniques may also be used to elicit responses to additional survey questions, such as providing either fixed or random rewards to participants who answer the questions. This latter technique might be more appropriate in cases where the answers are incapable of being judged as to accuracy, such as where the questions are attempting to elicit personal preferences. In any case, the data obtained from such additional survey questions can be quite valuable from a marketing standpoint, particularly when used in conjunction with the personal characteristic information provided by the participants.

It is contemplated that, in the preferred embodiment of the invention, various levels of participation will be available to participants. For instance, persons who log onto the website (or other network node) might only be permitted to browse the site for the purpose of determining what services are available and how the contest is played. However, in order to submit predictions a person would need to register. Upon registration various subscription levels would be available. In order to obtain higher subscription levels it may be necessary to pay higher fees and/or to qualify in some other way. For example, Basic Service might be available at no charge to all who register (including providing the personal characteristic information described above). Basic Service might entitle the participant to participate in the Open Challenge, use the library and Archives, access the Soapbox of the Week, and access all costless (e.g., 15 minute delay quotes) features. Many of the foregoing features are described in more detail below. An Advanced Service, which includes everything but the Premium Sites (see discussion below) and which might also include certain proprietary metrics relevant to the available sites, might be available at some charge. At a higher charge, a participant might select Premium Service, which includes the advanced service features, a number of Premium Sites and some proprietary metrics relevant to those Premium Sites. At a still higher charge, a participant might elect Institutional Service, which would include all sites plus some additional proprietary metrics, including an online form which allows the participant to enter third party advisors' forecasts and compare them to various benchmarks (generated from the contest data) for accuracy, bias, and efficiency evaluation (the "Yardstick"). The Yardstick can thus function as an element of due diligence evaluation when selecting and evaluating performance of fund managers, portfolio advisors, and staff economists.

As noted above, participants in the contest are ranked and/or rewarded based on their performance. There may be separate rankings for each of a number of different variables, for each challenge, and for different time frames with respect to a single variable or a single challenge. Thus, for example, there might be rankings for the best overall predictions in the Stock Market Challenge, best long-term predictions in the Stock Market Challenge (where long-term might be defined, for example, as predictions of one year or greater), and best short-term prediction for Microsoft stock (where short-term might be defined, for example, as predictions of less than two weeks). Any other categories may also or instead be selected for ranking, with the actual ranked categories preferably being determined based on the interest of the participants or the interest of the population as a whole, bearing in mind that an important function of the rankings is to inform as to the relative merits of the various participants. The highest ranking participants in each category may be rewarded with cash, cBucks, merchandise, services, additional investment information, or anything else of value. Alternatively, the chance to be highly ranked, as well as the corresponding publicity, alone might provide sufficient incentives to attract participants.

Within each category, there are a number of different ways in which to rank the various participants. Preferably, ranking is based on a combination of the relative accuracy (e.g., percentile rankings) of a participant for each prediction event in which he participated. Thus, as a simple example, assume that a ranking is being conducted for the best predictor of the DJIA for the "end of next week" over a particular three-month period of time. Also assume that there are 7 opportunities per week (i.e., one closing time point per day) to predict the value of the DJIA at the end of next week. Assuming further that there are exactly 13 weeks in the subject three-month period of time, then there will be 7*13=91 prediction events in the category.

However, not all participants will provide predictions for each prediction event. Some participants might not register until after the three-month period has begun. Still others might elect not to submit predictions for one or more days during the three-month period.

Accordingly, in the preferred embodiment, the participants are given a percentile ranking for each prediction event in which they participate. For purposes of consistency in speaking of percentile rankings, as used herein an x percentile ranking will be understood to mean the top x% of the forecasters; thus, the $1^{st}$ percentile will mean the top 1%. In one embodiment, percentile rankings are assigned based on the absolute values of the differences between the predicted value and the realized value.

Ties can be handled in a number of ways, such as assigning all tying predictions as the percentile midpoint that the tying group occupies; for example, if a group of forecasters predicted the same value and that group would have occupied from the $30^{th}$ to the $40^{th}$ percentile, everyone in the group could be assigned to the $35^{th}$ percentile. Alternatively, ties might be broken by ranking earlier unchanged predictions higher than later unchanged predictions; thus, if the closing time point were 6:00 p.m. and two tying predictions were last updated at 4:00 p.m. and at 5:00 p.m., respectively, the 4:00 p.m. prediction would be ranked higher than the 5:00 p.m. prediction.

In this regard, it is noted that the time of the last prediction update might be factored into ranking in other ways besides tie breaking; for example, for each participant the absolute value of the difference between the participant's predicted value and the realized value might be multiplied by a factor (the "time factor") that is based on the time of the last prediction update. All of such techniques will tend to encourage prediction updates as soon as new information is available to the participants, thereby increasing the size and continuity of the database available for combination forecasting.

In the preferred embodiment of the invention, the percentile rankings for each participant are combined into a raw score that is compared against the raw scores of the other participants, and then the participants are ranked based on their raw scores. It is also preferable that participants are rewarded for consistency. For example, someone who is consistently in the $20^{th}$ percentile might rank higher than another person whose median or average is the $15^{th}$ percentile but whose various individual percentile rankings exhibit greater variation. Finally, it is also preferable to reward participants who have predicted more of the available prediction events higher than those who have predicted fewer. In addition, a participant may be required to participate in a minimum number of required prediction events in order to be ranked. In view of the foregoing considerations, the following formula is one example of a ranking formula for use in the forecasting contest according to the preferred embodiment of the invention.

$$RawScore = median(percentiles) * (1 + \sigma) * \left(\frac{PE_t}{PE_p}\right)^x$$

where median(percentiles) is the median of all percentile rankings for prediction events in which the participant participated for the subject category, $\sigma$ is the standard deviation (or any other dispersion measure) of those percentile rankings, $PE_p$ is the number of prediction events in which the participant participated, $PE_t$ is the total number of prediction events in the subject category, and x is a real number, typically greater than or equal to 0, which specifies the extent to which participants are penalized for failing to participate in the maximum number of prediction events possible, with 0 reflecting no penalty and higher values of x reflecting higher penalties. Using the above formula, a raw score can be calculated for each participant in the category, and then the participants with the lowest raw scores are ranked the highest.

It should be understood that the above formula is exemplary only, and any other formula for combining percentile rankings (or other measures of relative accuracy), preferably that also incorporates the above-stated considerations, may be used instead. In addition, it is also possible to provide an overall ranking within a category by combining data that is indicative of the participant's absolute accuracy, rather than relative accuracy. This may be particularly desirable in cases where relative accuracy is difficult to obtain, such as in the embodiments described above where fixed closing time points are not utilized, but instead each participant's prediction is deemed effective when submitted. In the event that absolute accuracy is utilized, it is still desirable that the raw score formula incorporate the other considerations (e.g., emphasis on consistency, reward for increased participation and for predicting earlier) stated above.

However, one advantage of using relative accuracy such as percentile rankings in order to determine an overall ranking is that such relative accuracies facilitate comparison of participants who are predicting different variables. For example, one challenge might allow each participant to individually select a group of stocks whose prices the participant will predict. Although it may be unlikely that any two participants will select exactly the same stocks, each participant can nevertheless have a percentile ranking for each prediction event. The various percentile rankings can then be combined in the same manner as if all participants were predicting for the same stocks.

The formulas for producing raw scores may also incorporate other considerations. For instance, as described above, the contest permits participants to estimate certain variables in a number of different prediction events. When ultimately combined to produce a raw score, how well a participant did in one prediction event is weighted the same as how well he did in any other prediction event. However, it is also possible to weight the prediction events differently. For example, in a category where the value of the DJIA is predicted for the "end of next week", the Saturday prediction (which is 13 days away from the realization time) may be weighted more heavily than the Friday estimate (which is only 7 days from the realization time). Similarly, prediction events may be weighted differently depending upon how many participants participated in each prediction event.

Still further, the contest might be structured so as to permit participants to submit, in addition to a prediction value for each prediction event, an estimate of their own uncertainty regarding their prediction. In this case, prediction events for which the participant indicated a high degree of uncertainty might be weighted lower than prediction events for which the participant indicated a lower degree of uncertainty.

In such cases, the number of prediction events for which the participant is deemed to have participated (e.g., PEP) preferably would be adjusted accordingly. For example, a prediction event for which the participant indicated a low degree of uncertainty might count as 1, while a prediction event for which the participant indicated a moderate degree of uncertainty might count as ½, and a prediction event for which the participant indicated a high degree of uncertainty might count as ¼.

In addition, where participants are allowed to estimate their own uncertainty, such uncertainty estimates might be used to influence accuracy assessments. This may be accomplished, for example, by multiplying the absolute value of the difference between the predicted value and the realized value by a factor that is based on the indicated degree of uncertainty (the "uncertainty factor"), which may, if desired, be used in combination with the time factor described above. These modified differences may then be used for purposes of determining percentile rankings for individual prediction events. Thus, for example, a participant whose predicted value was off 1% from the realized value but who indicated a high degree of uncertainty might be given a better ranking (e.g., lower percentile) than another participant whose predicted value was off 0.5% from the realized value but who indicated a low degree of uncertainty. Alternatively, a quantity might be subtracted from an indication of prediction error (e.g., the absolute value of the actual prediction error) to produce a modified prediction error, where the subtracted quantity is based on the indicated degree of uncertainty; if the result of the subtraction is less than zero, the modified prediction error can be set equal to zero.

However the information is actually used, allowing participants to estimate their own uncertainty may provide additional information for improving the ranking process and, at the same time, provide additional data for producing more accurate combination forecasts. In addition, knowing that their uncertainty is going to be taken into account in their rankings may tend to encourage participants to participate in more prediction events, rather than just participating in events where they are relatively confident, thus making more prediction data available.

Summarizing, a contest according to the present invention can incorporate a number of different features that are not believed to present in conventional contest rankings. These features include: when ranking the participants, taking into consideration how far in advance of the closing time point a prediction was made (or last updated); providing additional incentives to update predictions and/or submit new predictions; basing overall ranking (i.e., track record over a certain period of time) on relative accuracy (such as percentile rankings) in individual prediction events, rather than on absolute accuracy; for purposes of overall ranking, taking into account how consistent an individual participant's performance is across the various prediction events; allowing participants to submit an estimate of their own uncertainty regarding their predictions; and using such indications of uncertainty in determining rankings for individual prediction events and/or for overall rankings. The advantages of these features are described above.

Prediction Input

In the preferred embodiment of the invention, participants have the option of inputting their forecast data either numerically or in a graphical format. Preferably, the user interface that provides such capabilities is implemented in a Java applet which is downloaded into the participant's computer when the participant is logged onto the contest website, as described in more detail below. However, the software for implementing these capabilities can also be embodied in a separate software package and stored on a computer readable medium, such as a CD-ROM. The software for implementing these features is referred to herein as the "Workbench".

Numerical input can be accomplished by having the participant type a specific numerical value into a designated field. For instance, assume that the participant is predicting what the value of a particular stock will be at the end of next week and at the end of 13 weeks, and believes that those values will be 180 and 200, respectively. In this case, the participant clicks on the "end of week" field for the stock, types in "180", clicks on the "end of 13 weeks" field, types in "200", and then (possibly after entering additional prediction and/or other data) clicks on the "submit" or similar button. This numerical technique of entering prediction data is very similar to what is commonly done in conventional techniques.

However, in the preferred embodiment of the invention, participants may instead opt to enter their predictions in graphical format using the Workbench.

Preferably, when a participant elects to submit data in graphical format, the participant is provided with a graph illustrating historical values for the particular variable under consideration and also indicating at least one time frame at which the variable can be predicted. One example of such a graph is shown in FIG. 5A.

Figure 5A:
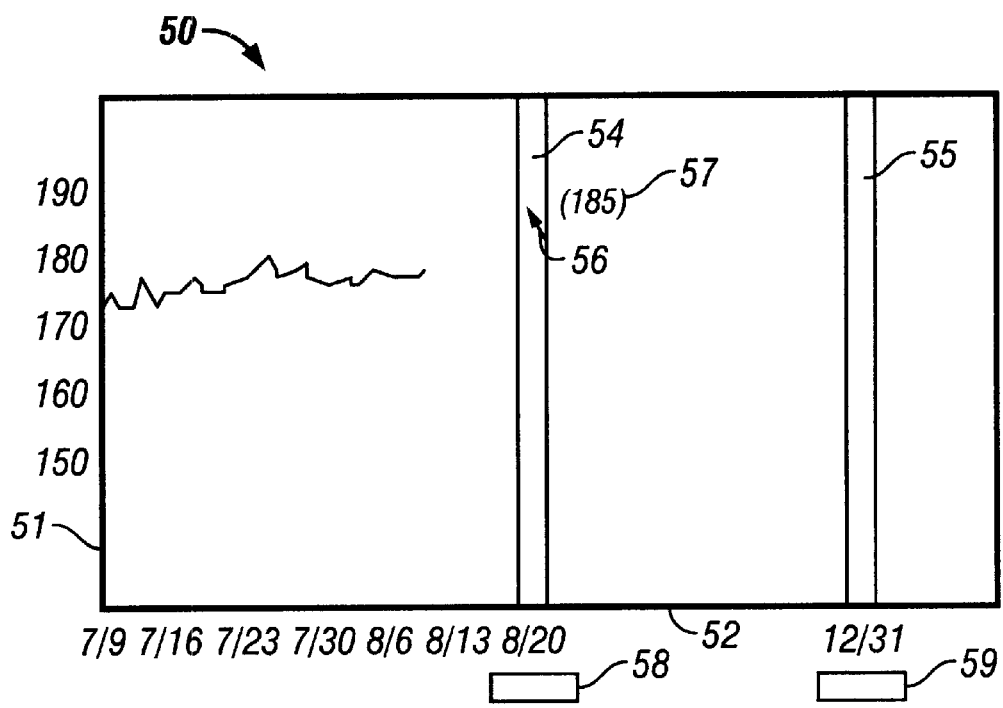
FIG. 5A illustrates a display for graphically entering prediction data for two time horizons according to a representative embodiment of the invention.

Specifically, FIG. 5A illustrates a graph 50 for predicting the value of a particular stock, in which the vertical axis 51 represents the price of the stock and the horizontal axis 52 represents time. The left side of the graph 50 illustrates historical values of the stock, preferably up until the current moment. The right side of the graph 50 includes bands for predicting future values of the stock, such as a band 54 for predicting what the value of the stock will be at the end of next week and a band for predicting what the value of the stock will be at the end of 13 weeks. Although graph 50 includes only 2 bands, the graph may instead includes bands for all time frames available for prediction (e.g., 5), or any lesser number of time frames.

It is noted that the amount of historical data presented may be varied. In the example shown in FIG. 5A, the initial time frame of interest is the "end of next week". Accordingly, the graph 50 is constructed to show daily fluctuations over a period of approximately five weeks. A different interval of time for presenting historical data may instead be presented, although lengthening the interval too much will tend to obscure shorter term fluctuations and, in the extreme, may make it difficult to discern fluctuations within the time frame of interest. On the other hand, shortening the interval too much might not provide the participant with enough historical data on which to make a well-informed prediction. Thus, the preferred time interval for presenting historical data is from 1 to 20 times the time frame of interest and, more preferably, 3 to 10 times the time frame of interest. For example, for "end of next week" predictions, historical data might be presented for the past 3 to 10 weeks.

Based on the foregoing considerations, at least the initial length of the historical time interval preferably differs depending upon the forecasting time frame.

Once that initial interval has been provided to the participant, however, the participant preferably also is provided with the option of expanding the interval (i.e., so that a longer interval of historical data is displayed in the same space on the screen), shortening the interval (i.e., so that a shorter interval is displayed in the same space on the screen), or zooming in on a particular segment of the interval (i.e., so that the selected segment is displayed in a larger portion of the screen), in any combinations selected by the participant.

Similarly, the range and scale of the vertical axis 51 preferably also may be adjusted as desired. In the present example, it is believed that a band around the fluctuations during the historical time interval displayed is most appropriate. However, any other default range may instead be used. Once again, it is preferable that a default range and scale are provided and then the participant is given the option of altering the range of values displayed, as desired. In this way, the participant is given maximum flexibility to configure the display according to her needs.

In order to enter a prediction, the participant simply moves her cursor to the appropriate band and clicks on the point where she believes the value will be at that time. Thus, if the participant wants to predict what the stock's value will be at the end of next week, she simply moves her cursor to band 54. In the preferred embodiment of the invention, when the participant moves the cursor into a prediction band the value on which the cursor is resting is automatically displayed. Thus, for example, when cursor 56 is moved into band 54, a value indicator 57 is automatically displayed. In the particular example shown in FIG. 5A, the cursor position corresponds to a value of "185". Therefore, the value indicator 57 displays "185". Moving cursor 56 up or down in band 54 causes value indicator 57 to display different values reflecting the cursor's vertical position. Designating a particular cursor position (such as by left-clicking a mouse button) causes value indicator 57 to convert into a text box which displays the same value that was indicated by value indicator 57. This allows the participant to change the indicated value to a completely different value, if desired, or simply to fine tune the prediction value with more precision than may be possible given the limited display screen resolution. In particular, the participant can do either by simply moving the cursor within the text box and using the computer keyboard to delete or enter new digits. Once such changes have been made, or in the event the participant is satisfied with the prediction indicated by the initial cursor designation, the participant can submit the prediction, such as by clicking on a "confirm", "submit" or similar button (not shown) on the display. Otherwise, the participant can cancel the prediction, such as by clicking on a "cancel" or similar button (not shown) on the display, and then moving the cursor to a different position in the band. In either event, the participant can move the cursor to a different band in order to enter a prediction for a different time frame.

Figure 5B:
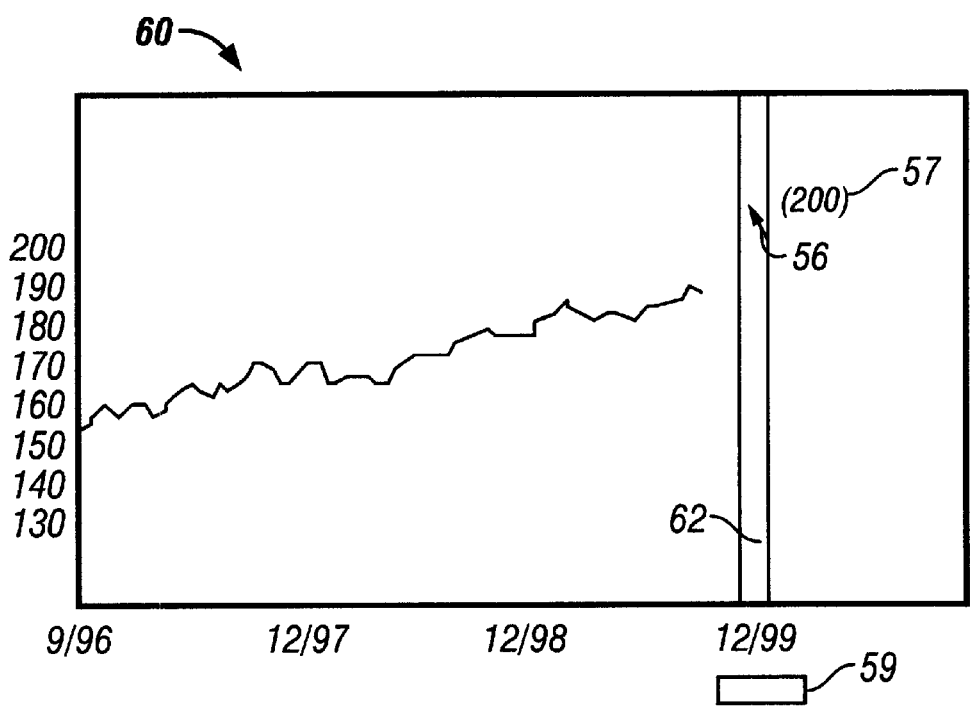
FIG. 5B illustrates a display for graphically entering prediction data for a single time horizon according to a representative embodiment of the invention.

As noted above, FIG. 5A illustrates bands 54 and 55, representing two different prediction time frames. However, the appropriate length of the historical data time interval displayed for the two might be different. In fact, even including band 55 (which is the end of 13 weeks) significantly shortens the amount of time that can be displayed within a given display width, particularly if one wishes to maintain a constant scale on the horizontal axis. This problem is even further exacerbated if more than two different time frames are displayed on the same graph. Therefore, if more than one time frame band is presented on the initially displayed graph, the participant preferably is given the option of reconfiguring the graph so as to optimize the display of historical data for each different band on the initial graph. For example, to so reconfigure graph 50, the participant might move cursor 52 into band 55, right click with her mouse, and then select "reconfigure" or an equivalent instruction. In response, graph 60 (shown in FIG. 5B) is generated. Because the present time frame is further out than the previous, historical data are provided over a longer time interval in graph 60. Specifically, historical data are now shown over a period of approximately 3 years, rather than 5 weeks. However, once again this display preferably is only the initial default display and the user can then custom-configure the display in other ways, such as those described above. Predictions are then submitted in the same manner as described above in connection with FIG. 5A, i.e., clicking in band 62 (which corresponds to band 55), using the text box 57 to fine tune the prediction if desired, and then clicking on the "submit" button.

Alternatively, a participant may avoid using the graphical input completely by typing a numerical prediction in a provided text box, such as text box 58 beneath band 54 or text box 59 beneath band 55. Also, for purposes of refining or changing a prediction entered using the graphical method described above, the numerical value of the graphically input prediction may be displayed text box 58 or text box 59, as applicable, rather than in a pop-up text box 57 next to cursor 56.

It is noted that, initially, participants may be uncomfortable clicking on arbitrary areas within a band. Accordingly, an alternate version would be to present users with discrete "buttons" for inputting predictions. Specifically, displayed on the left side of the graph would be the historical trend of recent past values up to the present time in a manner similar to that shown in FIG. 5B. Then, on the remaining right-hand portion of the graph, for each future time horizon, several buttons would be displayed for entering the participant's prediction. The available buttons can be scaled to offer a variety of choices consistent with the measure being considered. Preferably, the buttons would be arranged vertically from the highest value (or change of value) to the lowest value (or change of value) on the screen and would correspond to the time frame shown and indicated on the time axis. Participants preferably still would have the option of providing an exact numerical prediction instead of selecting a button for each prediction. When the predictions for each time frame for each variable have been entered, the participant would click to submit those predictions.

Figure 6:
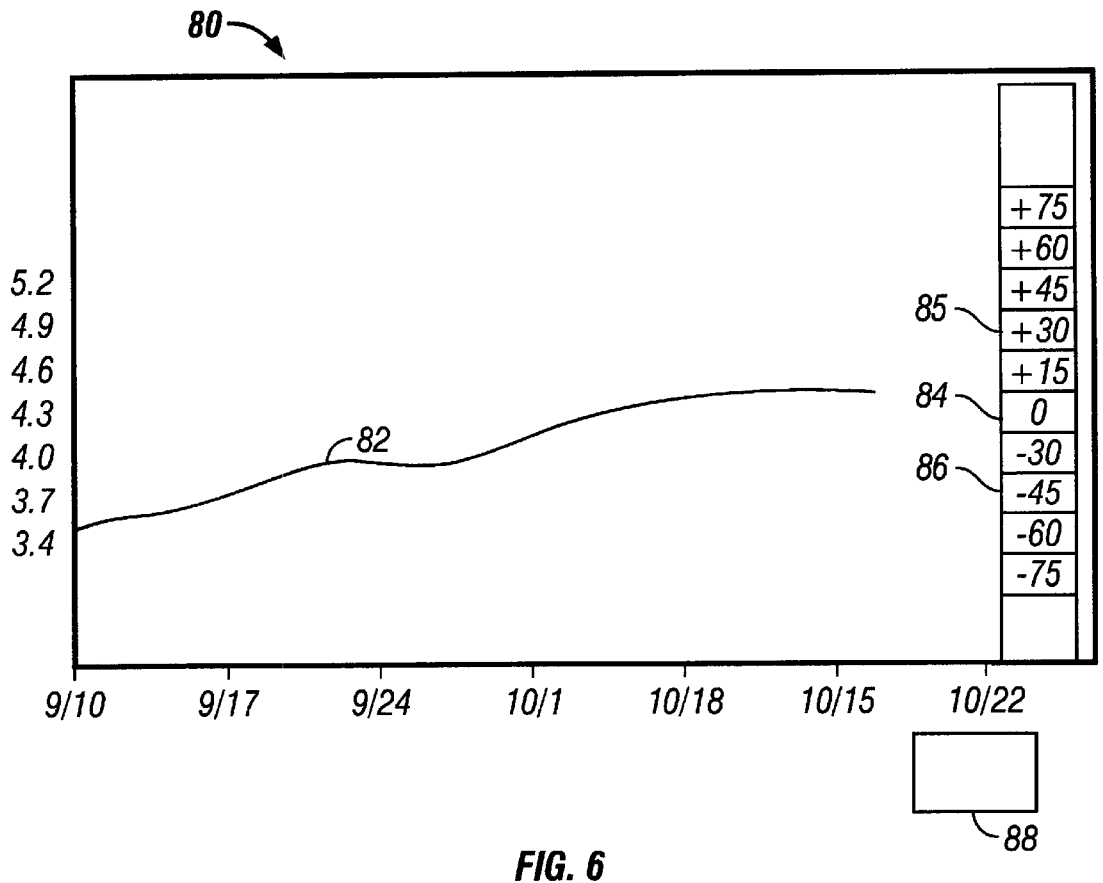
FIG. 6 illustrates a display for graphically entering prediction data using a discrete number of prediction input buttons, according to a representative embodiment of the invention.

FIG. 6 illustrates one example of the foregoing embodiment. Shown in FIG. 6 is a graph 80 for predicting the end of next week's value of the one-year treasury bill rate. Portion 82 of graph 80 illustrates historical values of the treasury bill rate over a time interval of approximately 5 weeks. On the right side of graph 80 are eleven buttons, such as buttons 84 to 86, that range from up 75 basis points to down 75 basis points. With this arrangement, participants can graphically predict what the value will be, in 15 basis point increments. Thus, for example, if one believes that the rate will be roughly the same as the most recent historical value, she would click button 84. Similarly, to indicate a prediction of "up 30 basis points" from the most recent historical value she would click button 85, and to indicate a prediction of "down 45 basis points" she would click button 86. Preferably, when a prediction is entered in this manner, the corresponding value (or change in value) is indicated in a text box, such as text box 88. The participant can then edit this value, such as for fine tuning, prior to submission. Alternatively, the participant might completely bypass the graphical input and instead directly input her prediction into text box 88.

The above graphs may be provided in a number of different ways and may include a variety of different features designed to enhance their usefulness to the participants. For example, the division between the historical data and the predicted future data might be designated by a change in color or by using a broad line, unique to the display. Similarly, the bands for prediction time frames may be designated by a change in color, a column of symbols, or any other method. In addition, if there is a large number of data points (whether historical or prediction bands) displayed, the date corresponding to any given time point might appear as a pop-up as the cursor is dragged across an imaginary vertical line through that point.

Also, additional data can be linked to the cursor position in the x coordinate (e.g., a specific date) and/or the y coordinate. For example, historical news headlines, date-specific commentary, date-specific prediction data, and other information may be linked to the date corresponding to the cursor position. Thus, at any given point within the historical data portion of the graph, or after blocking an interval of the historical portion, the participant might right click her mouse and then select "news headlines" from the menu, whereupon a list of news headlines for that time point or time interval, as applicable, would be downloaded to the participant's computer. Similarly, articles and date-specific prediction information may be linked to the dollar value corresponding to the cursor position. Thus, right clicking and then selecting "prediction statistics" from the menu might display various prediction information relating to that dollar value of the subject stock, such as the percentage of forecasters who have predicted that the stock price will reach at least that dollar value within the subject time frame. Such linked information might be pre-designated or generated on-the-fly. As examples of the latter case, a linked information request might cause a search of the Archives or might initiate certain processing of data within the prediction database.

Rather than displaying multiple prediction time frames on the initial graph, a single prediction time frame (e.g., the end of next week) might be displayed on the initial graph (e.g., with the default historical data for that prediction time frame). Then, after the participant submits a prediction for that time frame, the graph is automatically reconfigured to display the next prediction time frame (e.g., the end of 13 weeks, together with the default historical data for that prediction time frame).

This process would then continue until predictions had been submitted for all prediction time frames. When determining how many different prediction time frames to indicate on a single graph, there generally will be a tradeoff between the amount of historical information that can then be provided and the convenience of being able to enter predictions for multiple time frames on a single graph.

When predicting values for multiple related variables, the graphical user input can be provided in several different ways. For example, the Treasury Yield Challenge involves forecasting the yields on 5 bonds of differing maturity at 5 future points in time. The participant could accomplish this task by repeating any of the exercises described above for each of the five different variables (i.e., for 3 month and 1 year bills, 5 and 10 year notes, and 30 year bonds). If a different graph is displayed for each different time frame, this may require the display of 25 different graphs. Moreover, when using such a process it might be difficult to visualize how the different variables interrelate.

Figure 7:
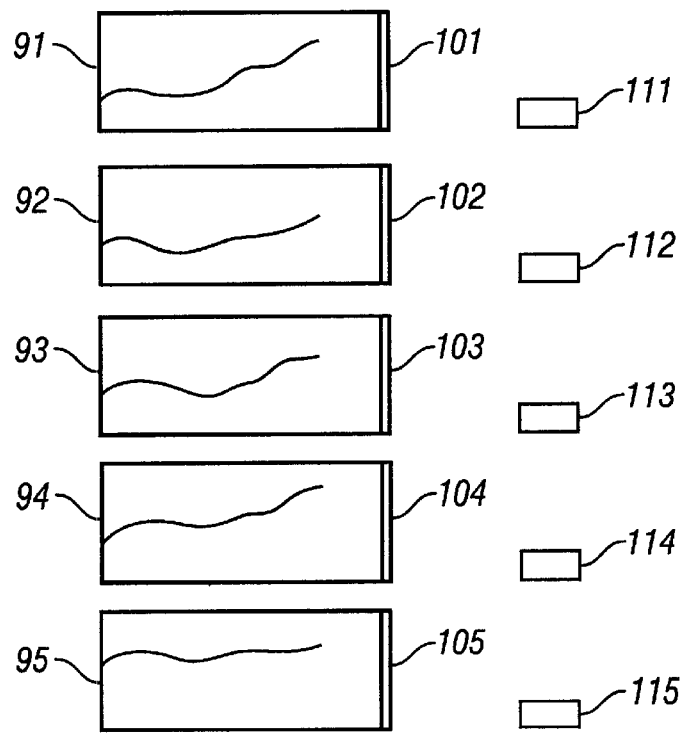
FIG. 7 illustrates a display that includes separate graphs, arranged in a stacked manner, for each of five different prediction variables, according to a representative embodiment of the invention.

One solution to this problem might be to permit the participant to display graphs for multiple variable/time-frame combinations in a stacked manner, and then enter predictions on each graph as described above. This embodiment is illustrated in FIG. 7, in which graphs 91 to 95 indicate prediction entry graphs for entering predictions for the end of next week for the five respective variables included in the Stock Market Challenge. Specifically, a participant simply clicks in the appropriate prediction band 101 to 105 to enter a prediction for each variable in the Challenge.

Also provided are text boxes 111 to 115, respectively, for fine tuning predictions or bypassing the graphical input altogether. Alternatively, a single text box might be provided for all of the graphs displayed.

The foregoing embodiment can permit the participant to view data for a number of different variables (or time-frame/ variable combinations) at the same time. However, this embodiment typically would require the participant to have a fairly large display screen, and therefore such a technique might be impractical for most participants. In addition, it may be desirable to provide the participant with the means to evaluate her predictions from different points of view prior to submitting them.

Figure 8:
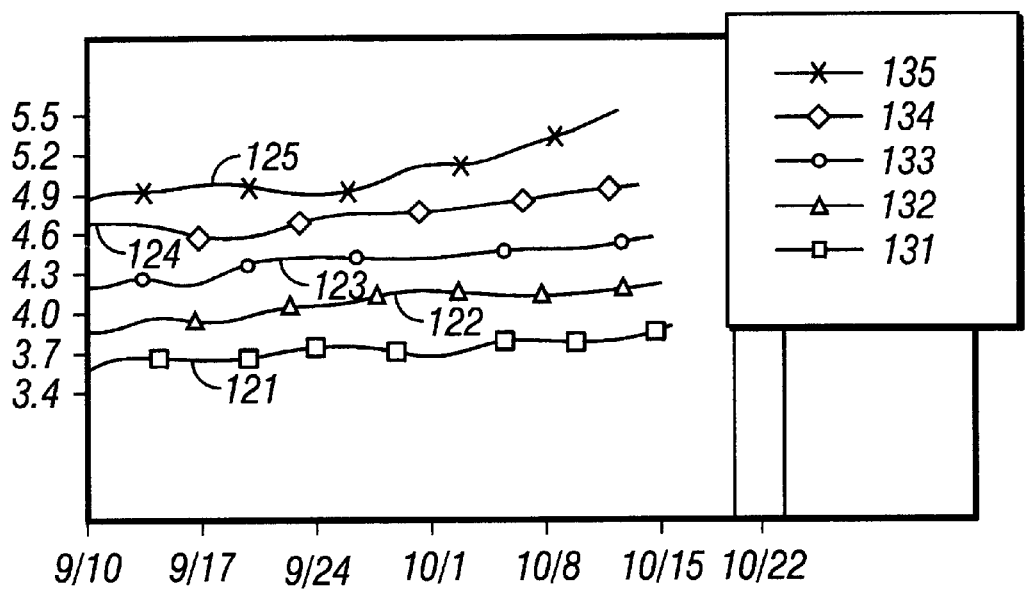
FIG. 8 illustrates a display of a graph that includes data curves for five different prediction variables, according to a representative embodiment of the invention.

Specifically, it may be desirable to permit various display manipulations between when the predictions are "entered" by the participant and when they are "submitted" to the contest. For example, with respect to the Treasury Yield Challenge, the participant might individually estimate the time series of the yield on each instrument, and then obtain a display (a "time series comparison view") that includes superimposed curves corresponding to multiple variable/time-frame combinations (e.g., each in a different color) on a single graph, enabling the participant to view historical and forecast values for multiple variables (e.g., the yields for all five instruments). This is illustrated in FIG. 8, which shows historical data 121 to 125 for the five variables, as well as the current predictions 131 to 135, respectively, for the time frame of interest. Further corrections could be made at this point if the forecast co-movements did not appear correct, such as by returning to the time series view for a single variable and then changing the prediction value(s). In addition to time series views, the participant preferably also has the option to request the cross-section (rotation) of the time series comparison view. With respect to the bond example given above, this view is referred to as the "cross-maturity comparison view", and shows 5 different curves (for the five different prediction time frames) of yield rate plotted against maturity date. Accordingly, this view provides another check point for making corrections to the participant's predictions.

It is also noted that, rather than using the time series comparison view and the cross-section (rotation) of the time series comparison view solely for verification purposes, a participant might also be permitted to enter predictions within those views. Because multiple variables are displayed in the time series comparison view, some means for designating the variable for which a prediction is being entered generally must be provided, such as clicking a radio button corresponding to the variable on the display. One advantage of this technique is that the participant is permitted to display data and enter predictions for different variables on the same graph, thus providing a constant view of data for interrelated variables.

As a further alternative to the above technique, the participant might initially forecast values within the cross-section (rotation) of the time series comparison view (e.g., in the same manner described above for entering predictions in the time series comparison view) and then request that the data be re-formatted into the time series comparison view for validation and/or corrections. Upon receipt of such a request, the Workbench automatically would generate the time series comparison view.

In a still further embodiment, the participant has the option of entering and/or modifying predictions in either the time series comparison view or the cross-section (rotation) of the time series comparison view and then switching back and forth between the different views. By iteratively fine tuning in each view, and then having the Workbench transform the data into the other view, the participant often will be better able to produce and submit forecasts that are more consistent with her actual expectations. In general terms, each of the different views can be provided either for reference purposes only or for both reference and prediction input, depending upon the specific embodiment of the invention.

Challenges that flow from the yield curve can be handled in a similar manner. In terms of the risk spread, prediction using the time series view can be repeated with an Aaa series imposed or, at the user's option, the difference may be graphed (e.g., 1 year Aaa yield–1 year treasury yield). Beyond that point, it may be more useful to graph the spreads (e.g., to avoid ten lines on a graph). The time series of the spreads at different maturities would be presented in a style similar to the "time series comparison view", and the future term structure of spreads in a style similar to the "cross-maturity comparison view". The same input modes would apply, and the participant would again have the ability to examine her predictions from different perspectives prior to submitting them.

In short, the Workbench preferably can: (1) allow the participant to submit individual time series estimates, aggregate them, and then take the cross section;

or (2) allow the participant to submit cross-section estimates, and convert those estimates into aggregated and disaggregated time series.

To aid in forecasting, other data curves for other variables preferably can be presented as overlays to the data curves for the prediction variables. These data curves preferably can either be displayed contemporaneously with those of the prediction variables, or can be offset with time leads or lags, as specified by the participant. In addition, arbitrarily selected values preferably can be graphically added to, or multiplied by, the various data curves, as desired by the participant so as to provide the participant with the maximum flexibility in manipulating various historical and prediction data to further aid in the participant's individual forecasting. The result can be a "visual" regression analysis that may be highly useful in performing the various forecasts.

Thus, the graphical display for entering predictions can be configured in a variety of ways to achieve maximum flexibility. In particular, the display interface according to the invention can provide graphs showing any combination of different variables and different time frames for entering predictions. Moreover, the present invention can permit each individual participant to customize her display in this regard so as to accommodate her own preferences.

In addition to displaying historical data for one or more variables, participants preferably also have the option of displaying their own previous predictions and/or the previous predictions of other participants. With regard to the latter, other participants' predictions may be displayed, for example, as a time series of the central tendencies of those predictions, together with an indication of the dispersion measure for those predictions at each point in time.

Figure 9:
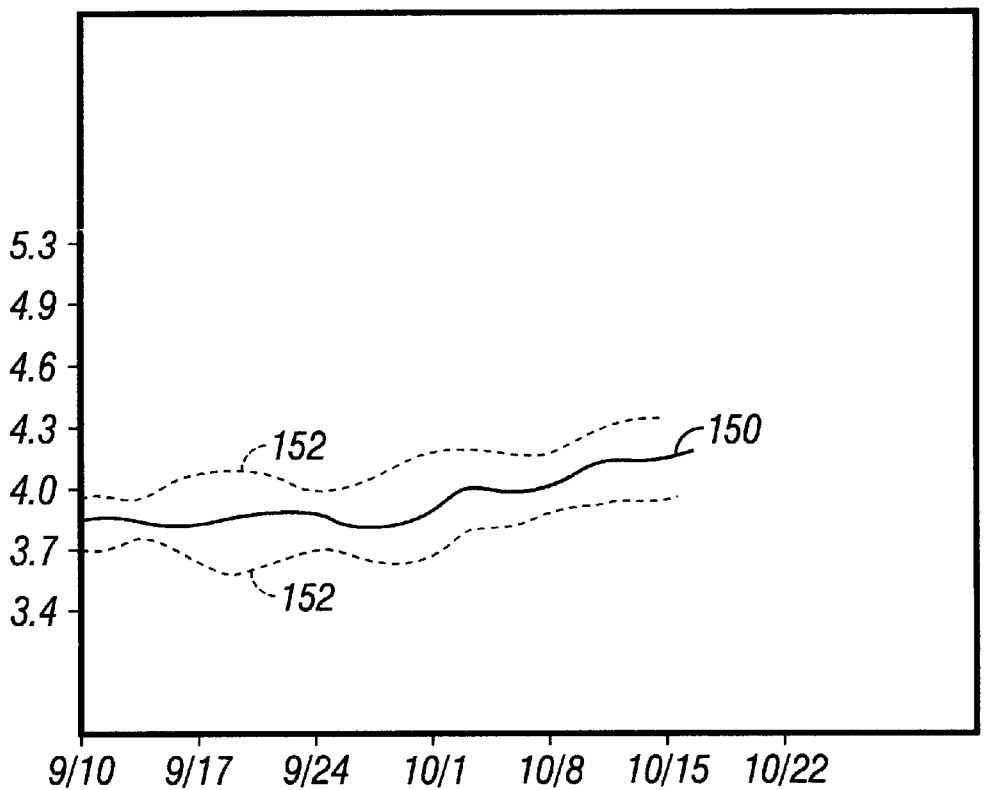
FIG. 9 illustrates the display of a graph showing the central tendency and dispersion data over time for predictions made by a group of forecasters.

An example is illustrated in FIG. 9, in which a measure of central tendency 150 for the other participants' predictions over time is plotted, together with an indication 152 of the dispersion around that central tendency. Preferably, the dispersion band 152 is symmetrical around the central tendency curve, with the upper limit of the dispersion band 152 being equal to the central tendency value plus the dispersion measure and the lower limit being equal to the central tendency value minus the dispersion measure. It is noted that any measure of central tendency (e.g., mean, median, trimmed mean or median) and any measure of dispersion (e.g., variance or the EUM measure described below) may be used, and the individual participant may even be given the option of which such measures to plot. In any event, the ability to display such information can provide a useful tool when a participant is attempting to formulate her own predictions. The foregoing information preferably may be plotted for all participants or any subset thereof (e.g., only participants in the requesting participant's Universe), preferably at the discretion of the requesting participant.

An additional statistical tool that may be provided is a regression package using preselected data and data transformations which will allow users to create their own statistical forecast models. Specifically, users may select dependent and independent variables from menus and then will choose which transformations (e.g., leads, lags, logs) to apply to the series prior to statistical estimation.

The Workbench preferably also provides statistical analysis on the participants' past forecasts versus realizations (i.e., errors). More preferably, the Workbench not only provides measures of error and bias, but also compares the forecasts to a number of implied models and identifies the closest model (e.g., "the subscriber forecasts as if she were using the following equation . . . "). The identified implied model preferably is then compared to optimal models to suggest what the participant may be under or over weighting. Both of these features preferably are included in the diagnostic and tutorial sections of the Workbench.

The following describes a representative example of graphical input according to the preferred embodiment of the invention. First, the participant selects the Interest Rate challenge as the challenge in which she wishes to participate. Next, the participant selects a view. Seven possible views exist, two summary views and five different forecast entry tool views. The summary views include the "time series comparison view", and the "cross-maturity comparison view". The five forecast tool views are for forecasting 3 month and 1 year treasury bill yields, 5 and 10 year notes, and 30 year bond yields and are similar to FIG. 5B. By selecting the 1 year t-bill forecast, a graph will be displayed with that variable's realized (historical) values displayed on the left and five bands displayed on the right corresponding to each of the forecasting horizons (e.g. end of next week (ENW), 4 weeks from ENW, 13 weeks from ENW, 52 weeks from ENW, and end of year (EOY)).

Before entering her forecasts, the participant may want to see old non-realized forecasts or other historical series. To select non-realized forecasts, two checkboxes are provided to allow the participant to display: (1) her most recent forecast (either for the current round if already entered, or from the previous week's game); and/or (2) last week's median forecast for the variable selected. As to other historical series, the participant may select, for example, her own forecasts or the overall median forecasts for the period. These are overlaid on the realized values to facilitate analysis. As each additional series is selected, a labeled data display field appears. When the user selects a specific historical time (represented by dragging a vertical indicator to the desired position, values for each variable appear in the display fields. Other tools may also be provided which allow the participant to transpose or forecast values.

Next, the forecasts are entered by selecting the time horizon (forecast for next Friday is default) and entering the value either numerically in a text box below the band, or by clicking on the appropriate spot within the band to enter the value and then fine tuning, if desired. The foregoing is then repeated for each band for the current variable and then all five time horizons are forecast for the other four variables. Finally, the two summary views are reviewed, the forecasts adjusted as desired, and then the forecasts are submitted upon completion.

The user interface according to the invention may also be configured in any of a number of different ways so as to permit a participant to submit an estimate of her own uncertainty regarding her forecast. For example, upon entering each forecast, such as in any of the manners described above, the participant may have the option of clicking one of several radio buttons, each indicating a different level of confidence (e.g., "very high", "high", "medium", "low", "very low"). Alternatively, the participant may be provided with the option of dragging a slide bar in order to indicate her level of confidence (on an approximately continuous scale), for example, from "very high" to "very low" confidence.

As noted above, in the preferred embodiment of the invention, the above graphs are provided over an electronic network, such as the Internet, by means of a Java applet. The following describes one embodiment for implementing the above functionality.

Figure 10:
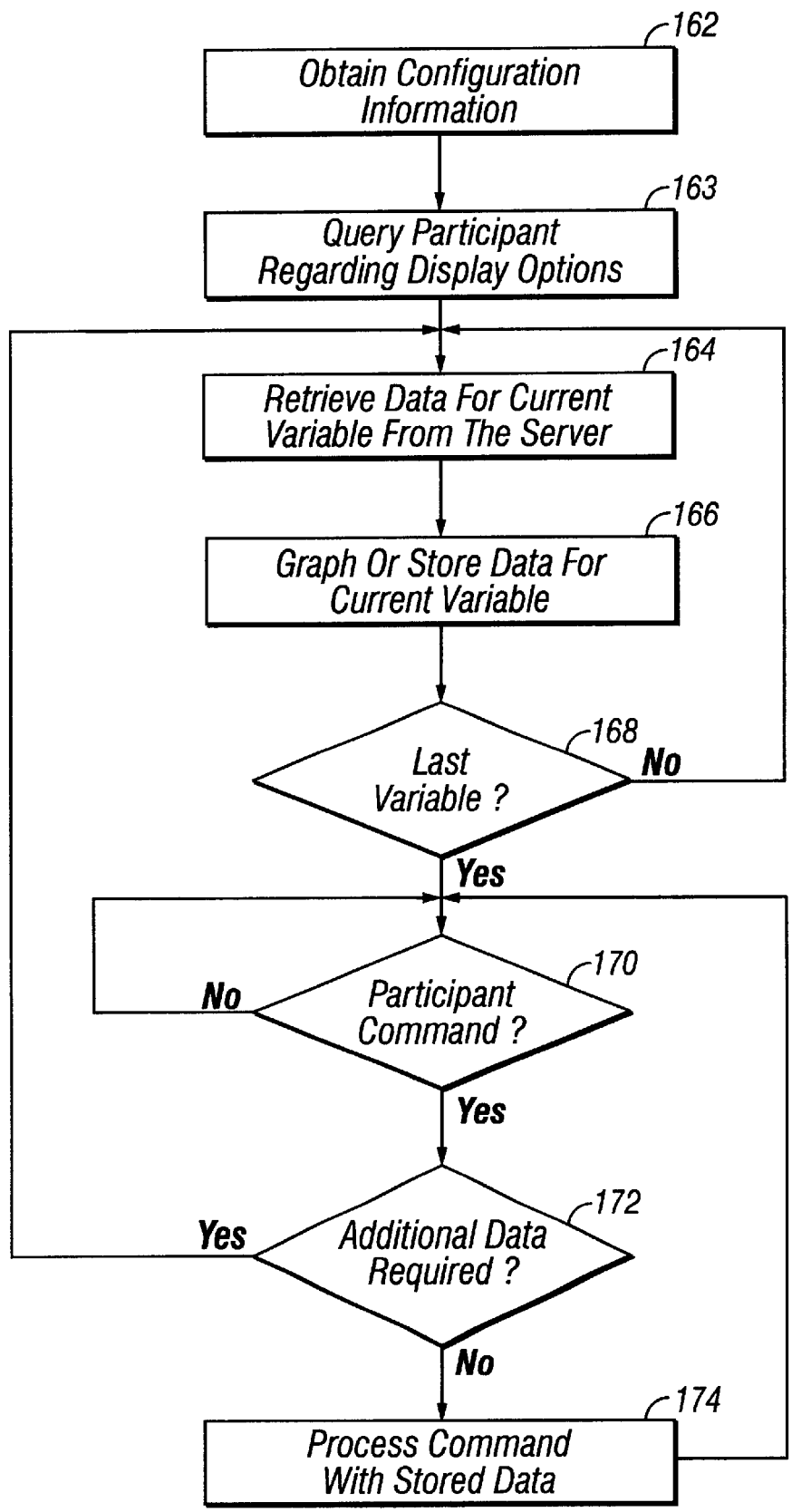
FIG. 10 illustrates a flow diagram showing process steps for implementing a graphical input display, according to a representative embodiment of the invention.

When a participant initially selects the "Tournament" page link from one of the other web pages of the contest website, the participant's browser sends an IP packet addressed to the contest website server requesting that page. In response, the contest website server downloads a Java applet to the participant's computer. In the preferred embodiment of the invention, the Java applet includes instructions to execute the process steps illustrated in FIG. 10. Referring to FIG. 10, in step 162 configuration information is obtained. Based on the identity of the participant (e.g., provided at login or stored as a cookie from a prior login) the applet will obtain configuration information from the server. Such information preferably includes (but is not limited to) the "default" variable (generally the variable most often forecast, or last forecast), specifications of all variables that previously have been forecast by this participant, plus any other variables to which the participant may have access, given her service level. Each variable preferably has associated with it certain additional configuration information, such as earliest date (DTe), earliest displayed date (DTd), and granularity (G).

In step 163, the applet queries the participant regarding how she would like the data displayed. For instance, the participant might be provided with the option to have the historical and prediction data displayed (1) one variable with one prediction time frame at a time; (2) multiple variables in stacked graphs; (3) multiple variables superimposed on the same graph; or (4) any other combination of the various display options discussed herein. When the participant provides her option selection, such as by clicking on a radio button, or a combination of radio buttons with each set directed to a different feature, the applet stores this information for later use.

In step 164, historical data are retrieved from the server for the interval from DTd to present, at granularity G, for the "default" variable. Then, data are retrieved from the server for the most recent forecasts of the "default" variable.

In step 166, the applet either graphs or merely stores the historical and prediction data for the current variable, depending upon the particular variable and the current display instruction. For example, if the current variable is the "default" variable, the applet preferably will display a graph with the "default" variable (historical and most recent forecasts) according to the display options selected by the participant. On the other hand, if the applet has just completed downloading information for a different variable, whether that information is displayed or merely stored preferably will depend on the display option information provided by the participant. For example, if the participant elected to have the variable superimposed on the same graph or displayed on a stacked graph, the information for the variable will be immediately displayed in the appropriate manner. However, if the participant elected to have only one variable displayed at a time, the information for the current variable will be merely stored until the participant is ready to have it displayed. In order to graph particular values, each data point is mapped onto a location on the display as a function of its value, with the scale of the graph being determined by DTd, G and the maximum and minimum data values over the displayed interval.

In step 168, a determination is made whether the current variable is the last variable. If so, then processing proceeds to step 170 to await additional commands from the participant. If not, then processing returns to step 164 to retrieve data for the next variable.

In step 170, the applet waits for additional participant instructions. Such instructions might include, for example: (1) request a graph of a variable that has not yet begun loading; (2) request a graph of a variable that has not previously been forecast, and so has not been queued for loading; (3) request an earlier time interval for a variable (prior to that variable's DTd but not earlier than DTe); (4) request a smaller time interval for a variable (indicating that data at finer granularity than the current value of G is needed); or (5) request that data for a variable that has already been loaded be superimposed as a new curve on an existing graph. It should be understood that the foregoing are merely exemplary; the participant may be permitted to request any display of data, as described in more detail above.

In step 172, it is determined whether new data are required. For example, with regard to the examples given in connection with the discussion of step 170, requests (1) to (4) would require additional data from the server, while request (5) would not. If more data are required, steps 164, 166 and 168 are repeated for each required variable in order to obtain and either store or graph such additional data. Otherwise, processing proceeds to step 174.

In step 174, the participant's instruction is processed using stored data. For example, with respect to request (5) described above in connection with the discussion of step 170, the data for the additional variable are retrieved from memory (e.g., RAM) or from mass storage (e.g., hard drive), as appropriate, and then are converted into graphical display data and added to the existing graph. Upon completion of step 174, processing returns to step 170 to await the next instruction.

In the preferred embodiment of the invention, the data are stored at the server in a database (preferably relational), arranged as a set of named tables. Each table consists of a number of rows representing the sets of data to be stored. Each table also consists of named columns representing the components of each row. The applet's access to the database is assumed to use a standard data access protocol such as JDBC, with a driver (if necessary) to provide connectivity to the remote database.

Each of the above data definitions can be interpreted as a query referring to one or more tables and requesting sets of data that satisfy the specification. Thus (for example), "Retrieve historical data from the server for the interval from DTd to present, at granularity G for the 'default' variable" could be represented as a pair of queries similar to:

Select*from SP500RealizedHistory where (StartDate='*DTd*') and (EndDate=CURRENT DATE) and (Granularity ='G')

And

Select*from SP500ForecastHistory where (StartDate='*DTd*') and (EndDate=CURRENT DATE) and (CustomerID='123456')

In this example, the table SP500RealizedHistory might contain the following columns:

| | |
|---|---|
| StartDate | A date representing the start of the time interval |
| EndDate | A date representing the end of the time interval |
| Granularity | An integer representing the distance between data points |
| Count | An integer representing the number of data points in the interval |
| Data | A BLOB (Binary Large Object) consisting of the array of data points as floats |

And the table SP500ForecastHistory might contain the following columns:

| | |
|---|---|
| CustomerID | An integer representing the identity of the customer |
| StartDate | A date representing the start of the time interval |
| EndDate | A date representing the end of the time interval |
| Count | An integer representing the number of data points in the interval |
| Data | A BLOB (Binary Large Object) consisting of the array of data points as floats |

Note that the CustomerID represents the identity of the participant, as determined above. By preformatting rows into a relatively small number of collections, the load on the database server is significantly reduced. Alternatively, it is feasible to cache all data in a "middleware" application and then communicate between the client and server via a proprietary protocol. This has the advantage that it does not require any database activity unless some of the data requested is not already present in the cache. Multiple variables may also be combined into one more elaborate table to simplify adding new variables.

If dispersion information is also available to this participant, then equivalent queries and table structures would be used, but the specific tables would have larger data arrays, as each "element" of the array would itself be an array of percentile and median values.

In a similar fashion, and using the known identity of the participant, the database server or middleware application is queried as to the most recent values forecast for a given variable.

When a new forecast value is entered and confirmed, the data are transmitted back to the database server using an update statement such as:

Update SP500Forecasts set EndOfYear='1510', CEndOfYear='0.85' where CustomerID='123456'

In this example, the table SP500Forecasts might contain the following columns: CustomerID An integer representing the identity of the customer

| | |
|---|---|
| EndNxtWeek | The participant's current forecast for the end of next week |
| EndNxtWeek4 | The participant's current forecast for 4 weeks from the end of next week |
| EndNxtWeek13 | The participant's current forecast for 13 weeks from the end of next week |
| EndNxtWeek52 | The participant's current forecast for 52 weeks from the end of next week |
| EndOfYear | The participant's current forecast for the end of the year |
| CEndNxtWeek | The participant's prediction certainty for the forecast for the end of next week |
| CEndNxtWeek4 | The participant's prediction certainty for the forecast for 4 weeks from the end of next week |

-continued

| | |
|---|---|
| CEndNxtWeek13 | The participant's prediction certainty for the forecast for 13 weeks from the end of next week |
| CEndNxtWeek52 | The participant's prediction certainty for the forecast for 52 weeks from the end of next week |
| CEndOfYear | The participant's prediction certainty for the forecast for the end of the year |

Generally, the forecasts made will also be accumulated in another table for tracking and data analysis purposes.

Although the above-described embodiment utilizes a Java applet, it is noted that the same process can be executed by a software application which is permanently installed on the participant's computer. Also, as noted above, rather than continuously having to download data from the server as needed, the software could store some portion of such data (either permanently or temporarily, e.g., in the latter case managing such storage and deleting the stored data after some period of time) in order to reduce the required download times.

Community-Selected Content

In addition to providing participants the opportunity to submit predictions and become ranked, as described above, the website according to the preferred embodiment of the present invention also includes certain resources that are available to the participants (or users), although the amount of resources provided to any single participant may depend upon the subscription level of the participant.

Among these resources, the contest website according to the preferred embodiment of the invention includes a number of distinct content areas (such as 100 different areas) on various topics of interest. These content areas are referred to herein as "Soapboxes". Moreover, although preferably implemented as content areas within the contest website, it should be understood that the Soapboxes may instead be implemented as separate websites, with the contest website including a link to each such Soapbox website. When included in a financial/economic forecasting contest website, the Soapboxes preferably are initially allocated according to the approximate representation of similar topics in the financial press and, to a lesser extent, the content of existing Internet sites.

Each Soapbox preferably has a title, an author, a "current headline" and a "feature article". These elements can be used for personalized home page construction. In the preferred embodiment of the invention, Soapboxes are designed to allow individuals or entities (the Soapbox Proprietors) to structure community interaction around a topic, philosophy, or point of view. Thus, in addition to simply including information, the Soapbox sites might include chat rooms, live broadcasts (either interactive or non-interactive) and other mechanisms designed to elicit user feedback. In order to provide access to the Soapboxes, one page of the contest website might include an overview for, and hyperlink to, each Soapbox, with each overview including the Soapbox title, headline, author, and an initial part of the "feature article".

It is also preferable that a search mechanism allows users to find relevant Soapboxes based on keywords. For example, a neural net (or similar mechanism) might weight search terms and matching documents to enhance precision and recall. Additionally, users can be provided with the ability to ask to see Soapboxes "similar" to a particular Soapbox.

In the preferred embodiment, the Soapbox Proprietors sponsor the content of their Soapboxes and receive a stipend, based upon popularity. It is also preferable that, periodically, the least popular Soapboxes are turned over to new Proprietors. It is further preferred that all Soapbox Proprietors must be subscribers and must submit a prescribed minimum number of forecasts.

The following are the preferred rules for the Soapboxes: (1) candidates wishing to sponsor a Soapbox must submit the proposed Soapbox title, a 100 word description of the Soapbox, the Soapbox type (e.g., one of commentary, moderated discussion, or narrated resource collection), three writing samples (each of 500 words or more), and three personal references; and (2) each Soapbox item accessed by a unique individual receives a point bump; (3) accessed Soapbox items can also be rated, with a neutral rating equivalent to no rating (the item receives only the default point bump), positive ratings worth positive (or more) points, and negative ratings worth negative (or less) points; (4) points that accrue to Soapbox items also accrue to the Soapbox owner; (5) access to archived Soapbox items also accrues (preferably lesser) points to the Soapbox owner; (6) periodically, such as every month, the lowest ranked (such as lowest 3%) of Soapboxes are "canceled" and Soapbox slots thus opened are filled from waiting candidates; (7) stipends are paid (based on the prior rating period) to Soapbox owners based on their ratings; (8) ratings are delivered weekly to Soapbox owners; (9) the highest rated (such as the "Top 10" and "Top 40") Soapboxes are highlighted, such as by including an appropriate logo indicating that status, and the highest rated Soapboxes (such as the "Top 10") are announced via press release every rating period; (10) Soapbox candidates must have contributed forecasts for at least three months prior to submitting their "application" and must continue to submit forecasts on a prescribed basis as a condition of maintaining their Soapboxes; (11) there exists an Acceptable Use Policy; (12) there exists an Oversight Board (preferably composed of contest staff members, Soapbox Proprietors, representatives from the user community, and outside representatives) charged with enforcing the Acceptable Use Policy—the Oversight Board can discipline and/or remove Soapbox owners, but such actions must be published within the Soapbox area; and (13) the foregoing rules are posted in the Soapbox area.

The website according to the preferred embodiment of the invention also includes a Digital Text Library (DTL) which is configured as an extensive, diverse collection of text materials for reference and research. The DTL preferably includes the Dumpster, the Archives, the Academy, the Research Room, the Reading Room, and the Journal Room.

The Dumpster and the Archives contain community generated content, maintained primarily by the Soapbox Proprietors.

The Dumpster is the repository for unreviewed and unedited text based material, uploaded by virtually anybody. Using a community scoring system (such as described below), Dumpster items may be elevated into one of the other collections. Dumpster contributions may also be identified by Soapbox Proprietors as items to be sponsored into Archive status; in such cases, the sponsoring Soapbox Proprietor's name preferably will be included as part of the descriptive information when the Dumpster item is promoted to Archive status. To the extent possible, Dumpster contributions are full-text searchable. The Dumpster content is not included in other site searches but is separately indexed with a significant disclaimer being displayed prior to searching or accessing these files.

The Archives is the primary full-text searchable database of materials provided by and through Soapbox Proprietors as well as materials elevated from the Dumpster. Soapbox Proprietors preferably can submit materials directly into the Archives. As part of Soapbox construction, Proprietors can choose to incorporate Archive Submission tools, in which community members submit materials to a Soapbox Proprietor for review prior to uploading into the Archives. When a Soapbox Proprietor approves a submission, the Soapbox Proprietor uses a Community Upload Tool to enter the contribution into her Soapbox. After a minimum amount of time as part of published Soapbox content, the submission is automatically uploaded into the Archives. This is the same process the Proprietor uses for uploading her own materials into the Archives. As discussed below, Archive materials preferably generate cBucks for the content provider as well as for the sponsoring Soapbox Proprietor when the materials are viewed by others.

The following are the preferred rules in connection with the Archives: (1) Soapbox contents are automatically archived; (2) feature stories and other material generated by the editorial staff of the contest are automatically archived; (3) Soapbox owners can sponsor items to be added to the Archives; (4) there is a special area of the Archives called the Dumpster—anyone can add material to the Dumpster; (5) all items in the Archives have a rating (point value) derived from cumulative accesses; (6) each item accessed by a unique individual receives a point bump; (7) accessed items can also be rated, with a neutral rating equivalent to no rating (the item receives only the default point bump), positive ratings worth more points, and negative ratings worth negative points; (8) standard searches exclude the Dumpster and return items are sorted first by keyword match, then by rating and/or access points; (9) Dumpster searches search only the Dumpster but return items sorted in the same way as standard searches; (10) highly rated Dumpster items (e.g., those exceeding a specified threshold score—see the discussion below) are "promoted" out of the Dumpster to the Archives proper; (11) there is a "top 40" area of the Archives, consisting of the forty highest rated items and the forty highest rated authors within the last week, the last month, and cumulatively; (12) items not meeting the Acceptable Use Policy are deleted; and (12) the Archive rules are posted in the Archives.

The Academy and the Research Room are a combination of contributed materials, solicited materials, and freely available materials consolidated from elsewhere on the web.

The Academy is a repository primarily for student papers, theses, dissertations, and other academic writings primarily by undergraduate and graduate students. These materials may be solicited through several "outstanding paper" competitions. Papers will be submitted to the Academy Editor, a staff position, who will catalog and then upload acceptable submissions into the Academy. In general, each submitted paper must be sponsored by a college or university faculty member. Each semester, there are hundreds of quality research papers on investment, business, economics, and forecasting topics produced by students as part of their training. Typically, the results of this research are completely lost following the semester's end. While probably not publishable in academic journals, in part because of the very specific scope of the research (e.g., "What Happened To Bank Stock Prices After Clinton's Reelection?", "The Performance of United Airlines Stock Following the Northwest Airlines Pilot Strike"), many of these papers would have interest to the broader financial and economic community either for direct review or to provide assistance in other research. For example, investors could review comparative industry research and prospective employers could identify students with specific topical experience. The Academy entries preferably are full-text searchable. As in other sections of the website, readers are able to rate papers and search results can be ordered by rating score.

The Research Room is a repository for professionally written research papers. The Research Room content preferably originates from three primary sources: professionals may submit copies of working papers, research reports, and other text to the Research Librarian; the contest website may sponsor research on specific topics, including academic research performed using the contest proprietary databases; and, the contest's Research Librarian can regularly add freely available research papers to the permanent collection. Sources of such research papers include numerous state and federal government agencies, members of the Federal Reserve System, international not-for-profits, foundations, and numerous academic departments which freely distribute working papers and faculty research summaries.

These documents may include PDF files in addition to fully searchable text. The Research Librarian may do initial keyword labeling for contributions based on abstracts or based on a physical review of the documents. In addition to providing ratings, readers may have the ability to provide additional comments on Research Room items, which preferably also are searchable and include a back-reference to the reviewed document, allowing for the community to dynamically enhance the keyword and metalabels, particularly for lengthy documents which are not full text searchable.

The Reading Room preferably contains the full text of books and monographs which are either in the public domain or for which the contest website has licensed or purchased e-text rights. The Reading Room preferably provides these books in an encrypted PDF format with full text search, and makes the encrypted texts available for reading using the contest's online text reader. The Reading Room preferably also has pointers to the contest Book Shop which sells custom printed versions of these texts. While community members and Soapbox Proprietors are able to suggest new acquisitions for the Reading Room, the Reading Room preferably is controlled solely by the contest staff members (e.g., the Reference Librarian).

The Journal Room preferably contains fully referenced academic journals distributed electronically and sponsored by the contest staff members. The following are examples of items which may be included in the Journal Room:

- a Journal that primarily discusses practitioner oriented investment strategies and forecasting using consensus forecast data;
- Letters that include shorter practitioner oriented articles including methodology, empirical results, and new models with application to practical forecasting and investing;
- a Journal of Computation, Economics, and Statistics—an outlet for serious methodological and empirical research utilizing consensus forecasting data; and
- Transactions—an outlet for serious academic research which has had difficulty being published in other outlets primarily because of "taste trends" in academia.

The foregoing items may be published by the contest staff members and include editorial boards whose members are Soapbox Proprietors and recognized scholars. All accepted contributions preferably are fully indexed.

Each item in the Digital Text Library preferably is assigned a permanent file name and unique URL, and has an associated catalogue entry which may be updated. The basic catalogue entry preferably includes the URL of the originating site, the document type, creation date, acquisition date, key words or abstract (especially for documents which are not full text searchable), title, authors and affiliations, the identity of the entry sponsor if any, and current rating information for the document. Where appropriate, additional data may be included in the catalogue entry. However, Dumpster entries preferably have a more limited catalogue entry. Preferably, the Digital Text Library conforms to digital library best practices, as the same change from time to time, in order to maximize the likelihood that the DTL provides useful a useful resource database, rather than simply a mass of data. To this end, it is currently preferred that the DTL implement Z39.50 WAIS standards for accessing and retrieving free text data.

As indicated above, the Soapboxes, items in the Dumpster and items in the Archives preferably are scored based on their value to the users. Each such resource preferably is ranked each week based on user ratings. Although such rankings can be performed in a number of different ways, the following describes a ranking system in the preferred embodiment of the invention. Each item may be assigned a fixed number of points, such as 1, either each time it is accessed, each time it is accessed by a unique individual, each time it is accessed by a unique individual over a given period of time (e.g., a maximum of 1 point per unique user per day), or using any other system that assigns a predetermined number of points based on access alone.

It is also preferred that users are allowed to rate the utility of the resources that they access. For example, users may be given the following options for rating resources, with the point values for each option indicated:

−2 :Terrible

−1: Poor

0: Neutral

+1: Good

+2: Excellent

The point values may or may not be disclosed to the users. A failure to rate preferably results in a point value of 0. Preferably, the point values from such ratings are added to the point values from access alone, although it is also possible to assign points for access only or for ratings only. Such point values might be used directly to rank the various resources. However, in the preferred embodiment of the invention, the point values originating from users who are deeply involved in the website are given more weight than the point values originating from less involved users. In the preferred embodiment of the invention, this is accomplished by evaluating each user's activity over an Assessment Period (e.g., the previous 90 days) and assigning the user an "Intensity Budget" (IB) based on such activity, such as follows (assuming 90-day Assessment Period):

$$[(1+a_0*\text{num\_forecasts})^{b_0}*(1+a_1*\text{soapbox\_activity})^{b_1}*$$

$$(1+a_2*\text{resource\_activity})^{b_2}*(1+a_3*\text{forecast\_score})^{b_3}*$$

$$(1+a_4*\text{annual\_fees\_paid})^{b_4}*(1+a_5*\text{num\_club forecasts})^{b_5}*$$

$$(1+a_6*\text{ad\_banner\_clicks})^{b_6}*(1+a_7*\text{num\_}$$

$$\text{referred\_customers})^{b_7}$$

$$(1+a_8*\text{cBucks\_earned})^{b_8}* \alpha]^\gamma$$

where:

num_forecasts=the number of forecasts made by the user during the previous ninety days;

Soapbox_activity=number of hits by the user (maximum of 1 per hour) during the previous ninety days (i.e., ranges from 0 to 2160);

resource_activity=number of resources used by the user (maximum of I per hour during the previous ninety days (i.e., ranges from 0 to 2160);

forecast_score=maximum, over all challenges entered, of the means of the percentile scores for each challenge entered annual_fees_paid=the current amount of annual fees paid by the user;

num_club_forecasts=the number of forecasts made in the past ninety days by clubs while the participant was a member of such clubs ad_banner_clicks=the number of advertisement banner clicks by the user in the previous ninety days;

num_referred_customers=the number of new paying customers referred by the user in the past ninety days;

cBucks_earned 32 the amount of cBucks earned by the user in the past ninety days;

all $a_i$, $b_i$ are real numbers; initially it is preferable that $a_i$=1.0, $b_0$=1.5, $b_1$=1.0, and all other $b_i$=0; however, these parameters preferably are changed based on experience; for example, any or all of such parameters might be incremented by 0.01 until optimal values are determined;

α and y are real numbers and initially it is preferable that α and γ=1.0; however, these parameters preferably are changed based on experience; for example, either or both of such parameters might be incremented by 0.01 until optimal values are determined.

Each user's IB then preferably is divided by the count of the number of items that the user rated during the Assessment Period to generate an "Intensity Weight (IW)". The point values assigned by a user (either for access alone, ratings alone or both) are then multiplied by the Intensity Weight to generate modified points. By so doing, those who are most involved with the site are given the most weight in determining the value of rated items.

In addition, these modified points may be further modified according to a possibly nonlinear (and possibly asymmetric) transformation function. For example, the values may be weighted by their square (but maintaining the sign of the rating), placing more weight on extreme values (and opinions). It is noted that this further transformation may be performed either without applying the IW weighting, before the IW weighting is applied, or after the IW weighting is applied.

In addition, the number of points assigned as a result of a user's ratings might be modified based on the user's ratings history. Thus, for example, users whose ratings typically do not exhibit much dispersion might be spread out relative to others whose ratings are more disperse. Similarly, users whose ratings exhibit a bias relative to the norm might be adjusted so that the user's central tendency is more aligned with the group norm.

For the sake of simplicity, any references hereafter to the term "points" shall include any modifications described above.

The points described above may be used directly to rank the resources against each other. However, doing so would likely result in significant week-to-week fluctuations that might not accurately reflect the long-term usefulness of the various resources. Accordingly, in the preferred embodiment of the invention, such rankings are performed by taking into account the total number of points received by each resource over time, with the number of points further back in time given less weight than points received more currently. For example, the points received by a resource might be converted into a score according to the following formula.

$$\text{Score} = \sum_{t=0}^{25} a_t e^{-rt}$$

where t is the week number (i.e., 0 corresponds to the past week, 1 corresponds to two weeks ago, etc.), $a_t$=the sum of all points during week t, and r=a real number which may be chosen based on how quickly one desires to devalue prior weeks' points; in the current embodiment r =0.1. Similarly, the upper limit for t may also be varied.

After determining scores, such as in the foregoing manner, the various resources can be ranked against each other. Typically, Soapboxes will be ranked against other Soapboxes, Archive items will be ranked against other Archive items, and Dumpster items will be ranked against other Dumpster items. Such scores, rankings and/or points can be used to identify the top items or Soapboxes, to compensate Soapbox Proprietors, to promote items out of the Dumpster and into the Archives, and/or for a variety of other purposes.

In this regard, Soapbox Proprietors may be compensated in any of a variety of ways. For example, a Proprietor may be given a fixed monthly stipend (such as 50 cBucks) and/or also may earn additional compensation based on the Soapbox's current score (e.g., (1+score)*0.0001), the total number of points over a given period of time, and/or the Soapbox's ranking in comparison to other Soapboxes. The following is an example of one technique for rewarding Proprietors based upon the ranking of their Soapboxes, where the rankings are determined and the following compensations paid each month:

Top 5%: $800 per month+Advanced Service+200 cBucks

Next 10%: $400 per month+Advanced Service+100 cBucks

Next 20%: $200 per month+Advanced Service+50 cBucks

Next 40%: $100 per month+Advanced Service+25 cBucks

Other: $000 per month+Advanced Service+25 cBucks

In addition to a number of Soapboxes that depend upon their ratings for their continued survival, there may also be included a number of Soapboxes that are available to paying Proprietors ("commercial Soapboxes"). The price for obtaining such commercial Soapboxes might be fixed or might be determined based on an auction of such commercial Soapboxes. Although the ranked and commercial Soapboxes might be available to the general public without first accessing the contest website, it is preferable to restrict the availability of at least some of the Soapboxes so that they are accessible only through the contest website.

The above rankings might also be used to designate items in the Archives according to their popularity or usefulness. For example, there might exist a separate section of the Archives that contains only the top 40. Alternatively, or in addition, the rankings might be used to prioritize items located pursuant to a keyword or other search of the Archives. Furthermore, the rankings themselves might be used as a search criterion for obtaining items from the Archives (e.g., to retrieve published articles about combination forecasting, but only those in the top 25% of the rankings).

The rankings may also be used for Dumpster items in the same manner as for items in the Archives. In addition the rankings can be used alone or in combination with other variables to determine when to promote an item out of the Dumpster and into the Archives. For example, the top x % of the Dumpster items in each week might automatically be promoted into the Archives. Alternatively, promotion might require an item to be in the top x % for a specified minimum number of weeks. Similarly, promotion might be based on achieving a specified minimum number of points, a specified minimum score, or a specified minimum of either over a predetermined minimum period of time.

In the foregoing manner, the present invention allows users to participate in determining the types of resources that are available to them over a website, thereby helping to insure that the website content stays relevant to the end users.

Combination Forecasting Using Clusterization

In addition to allowing participants and third parties to compare the prediction accuracies of the various participants in a wide variety of categories, the contest described above also results in an enormous database of prediction data. Calculating even existing statistical measures based on the data in such an enormous longitudinal database can provide information that is qualitatively different than the information that is available when obtaining similar statistical measures based on forecast data from smaller, more homogenous groups. In addition, the present invention also provides certain novel processing techniques for generating new statistical measures and for creating improved combination forecasts.

Although in the preferred embodiment of the invention the database is generated from a forecasting contest, any other method may be used to obtain a large quantity of financial and economic forecasting information from a very large longitudinal forecast panel (e.g., thousands, tens of thousands or even hundreds of thousands of participants). Whatever technique is in fact utilized, such information generally will share a common problem. Specifically, such a large number of forecasters typically cannot be expected to participate at the same level or at the same times. Thus, individual forecasters may come and go, and each forecaster typically will participate according to his or her own schedule, which often may not be fixed or regular. Although some forecasters will submit predictions regularly, others may submit only sporadically. These problems are particularly troublesome in combination forecasting, which conventionally attempts to weight the predictions for each forecaster based on performance over a period of time, thus requiring a consistent pool of forecasters.

In order to cope with the foregoing problems, conventional combination forecasting techniques often simply discarded much of the sporadic forecast information, as well as forecast information from participants who did not participate during the entire time period of interest. This approach has severely limited the effectiveness of performing large scale combination forecasting, to the point that combination forecasting has tended to focus on relatively small groups that could be counted on to consistently provide predictions.

The present invention overcomes these difficulties, thus permitting large scale combination forecasting, in the following manner. First, participants are grouped into clusters based on similarities of their predictions. Specifically, it is noted that with a massive forecasting panel, there is likely to be significant redundancy among the individual forecasts, as people rely on similar newsletters, broadcasts, or forecasting methodologies. Utilizing cluster analysis, a standard statistical grouping method, in an innovative manner, the present invention is able to take advantage of these forecasting redundancies to address the nonparticipation problem when computing optimal nonlinear combination forecasts.

Next, forecast statistics are determined for each cluster. Finally, each cluster statistic is weighted (based on dispersion within the cluster and historical accuracy of the cluster) and the cluster statistics are combined to produce a combination forecast. In this manner, the cluster statistics can still be used even if the individual participants in the clusters vary over time.

Additionally, in order to cope with new participants, formulas are determined for assigning participants to the clusters based on their personal characteristic information. Specifically, formulas are sought which result in clustering that is as close as possible to the clustering that was obtained based on the forecasters' predictions. Once these formulas have been obtained, new participants can be assigned to a cluster based solely on the personal characteristic information that they have provided. Preferably, participants are periodically also reassigned to clusters (i.e., the clusters are re-formed), and the corresponding formulas for assigning new participants to clusters recalculated, in order to reflect societal changes over time.

The foregoing technique is described in more detail with reference to FIG. 11. Briefly, according to FIG. 11, clusters are formed, cluster assignment formulas are calculated, cluster statistics are generated, and then the cluster statistics are weighted and combined. Each time new combination forecasts are desired, the current participants are divided into the appropriate clusters and the foregoing generating, weighting and combining steps are repeated. In addition, periodically, new clusters are formed and new assignment formulas calculated.

Figure 11:
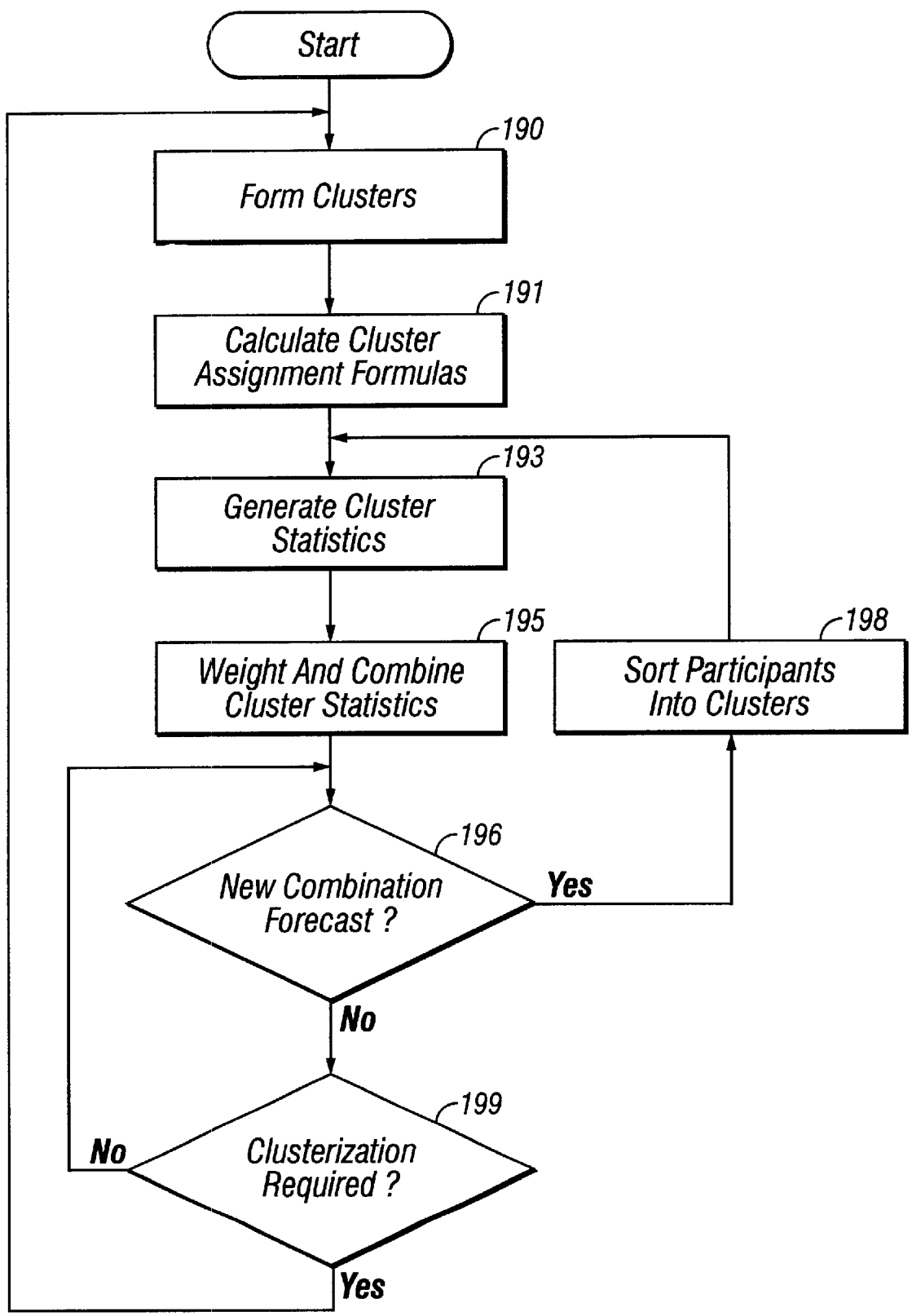
FIG. 11 illustrates a flow diagram showing steps for generating combination forecasts using clusterization, according to a representative embodiment of the invention.

In more detail, in step 90 of FIG. 11 new clusters are formed based on the prediction values of the individual participants. These cluster identifications preferably are done only on the basis of the forecasts themselves. Cluster Analysis algorithms (such as are available in Systat and numerous other multivariate statistics computer programs) attempt to group the data into clusters such that the measured distance between individual data points within each cluster is a minimum, but also such that the measured distance between two clusters is maximized. In otherwords, cluster analysis attempts to group data points so that the groups are as much alike as they can reasonably be, but also so the groups are as reasonably different from other groups as they can be.

There are numerous standard methods for clustering data which could be employed, including: discrimination functions, factor analysis, and grouping techniques such as iterated Chi-Square and maximum-distance measures.

In the preferred embodiment of the invention, vectors of forecasts for each individual are used as the columns in a matrix, with each row associated with a particular forecast date. The individual forecasters are clustered using Systat or a similar program. More preferably, the currently preferred method is the KMEANS statistical procedure included in statistical packages such as SYSTAT and the S+statistical modeling language. In this case, the forecast data matrix preferably is constructed as an (n×p) matrix, with n forecasters and p possible forecasts to be reflected by the cluster; if p equals 1, then unique clusters are computed for each forecast; if unique clusters are identified for each regular time horizon, then p would equal 5. Initially, p will be set to 1.

The KMEANS algorithm splits the n forecasters into groups by maximizing the between group distance and minimizing the within group distance. While there are numerous possible distance measures which could be used, such as Pearson Product Moment Correlation, Sum of Squared Deviations, and Rsquared (1–Squared Pearson Product Moment Correlation), the preferred embodiment uses the Minkowski distance, the z-th root of the mean z-th powered coordinated distance, with an initial parameter $z=2$. This will result in g clusters being created.

It is noted that a different set of clusters may be generated for each possible category (e.g., one cluster for short-term Microsoft stock, one cluster for long-term Microsoft stock, one cluster for long-term DJIA), where each category is a different variable/time-frame combination. However, more preferably, at least some of the sets of clusters will be formed based on predictions over multiple different categories (e.g., short-term DJIA, short term price of Microsoft stock and short-term NASDAQ index). The optimal combinations of categories to use for forming the various clusters, as well as the categories for which those clusters will be used in forming combination forecasts, can be determined empirically by mining the database using, for example, neural network techniques.

In step 191, the cluster assignments formed in step 190 are statistically associated with demographic and other personal characteristic information, such as Internet or specific website (e.g., the contest website) usage patterns. For example, the information for each of a number of personal characteristic traits can be first converted into quantitative data in a predetermined manner. Next, a parametric equation that includes the personal characteristic variables, together with the still unknown parameters, is constructed. Such a parametric equation might, for example, be a simple linear combination of the personal characteristic variables. Finally, the values of the parameters are determined in a manner so that the mapping based on the personal characteristic data as closely as possible matches the clusterization based on the forecast similarities. Such optimization can be accomplished using linear or non-linear regression techniques, such as by finding the parameters that result in minimum squared error, or by using any other optimization criteria. The resulting model will be used to provide preliminary cluster assignments for new forecast participants.

Using multinomial logit regression, such as implemented in Systat and other multivariate statistical programs, the best assignment formulas can be computed which relates the demographic and other variables to the cluster assignment. Alternatively, for example, using Classification and Regression Tree techniques, such as implemented in SPSS and other multivariate statistical programs, assignment formulas based on the demographic variables can be determined. Still further, for example, using Chi-Square interaction detection, such as implemented in SPSS and other multivariate statistical programs, assignment formulas based on the demographic variables can be determined.

Multinomial logit, CART, and CHAID techniques are among numerous multivariate techniques which can be applied to solve the assignment formula problem, but currently the preferred embodiment utilizes multinomial logit because it is believed that better statistical interpretations can be made from the resulting equations (for example, the interpretation of odds ratios which allows the direct evaluation of the relative importance of different variables as assignment predictors).

For example, once the cluster assignments are made based on the (n×p) forecasting matrix, the (n×1) cluster assignment vector can be appended to the (n×k) forecaster characteristics matrix containing the k characteristics (demographics and subscription variables). Using the k characteristics, a mathematical function can be estimated in which the (n×k) characteristics matrix is used to predict the value of the (n×1) cluster matrix. This will be a nonlinear function estimated using multiple logit regression on the g possible cluster values, a statistical technique similar to regression.

As a robust check to the multiple logit regression analysis, a genetic algorithm can be applied using a standard implementation such as the Palisade Software "Risk Optimizer" or the S+Genetic Algorithm Library to check for other solutions to the problem of mapping the characteristic matrix onto the cluster assignment vector. By using the multiple logit regression weights as initial values for the Genetic Algorithm assignments, the multinomial logit likelihood function can be evaluated repeatedly to ensure that the results are global rather than local optima.

The resulting multiple logit regression model will be used to give interim cluster assignments to new forecasters until new cluster assignments are computed.

In step 192, various cluster statistics are generated for each of the clusters formed in step 190. Specifically, a number of clusters will be associated with each variable for which a combination forecast is to be generated. Thus, if a combination forecast is desired for the short-term DJIA, statistics will be generated from the set of clusters associated with that prediction category. Preferably, these statistics also include a measure of central tendency for the cluster forecasts, such as the median or the trimmed mean, computed using an optimally computed trimming function, with the trimming thresholds established to minimize the mean-squared forecast error for each forecast time horizon for each cluster. This will result in a cluster forecast which will contain representative information from the cluster, but without the need for each individual to be frequently updating forecasts. In addition, various dispersion measures can be computed for each cluster, such as the standard deviation or the expectational uncertainty measure (EUM)—defined here as the range of the dataset after trimming, as a percentage of the median.

In step 195, the cluster statistics are weighted and combined to produce combination forecasts and other statistical indicators. Specifically, the measures of central tendency preferably can be used as the predictor variables in optimal nonlinear forecast combination equations which combine the information across the clusters in a way that minimizes mean-squared forecasting error or other loss function. Functions of the measure of dispersion within a cluster may be used to determine whether the given cluster should be given relatively more or less weight in the optimal combination forecast. For example, when a cluster is more "tight" about its central tendency, that cluster will be given more weight. When it is more disperse, that cluster will be given less weight.

For example, using the optimal clusters and the statistics derived from them, including central tendency and dispersion statistics, a nonlinear model with endogenous parameters is readily estimated. In one example, the model is a fourth order Taylor Series expansion around the dispersion statistics for the various clusters. The Taylor Series coefficients can then be determined using a regression technique based on historical accuracies of the clusters. As a result, the weight given to a particular cluster in this example varies based on a function of the dispersion statistic for the cluster and based on historical accuracy of the cluster. Moreover, using different clustering for different categories, the specific weighting can be specific to each category (i.e., each forecast variable/time-horizon combination). Similarly, based on historical values of cluster forecasts and realizations, an optimal linear aggregation equation can be readily estimated for purposes of producing aggregate forecasts for particular forecast horizons.

For example, a linear combination method similar to the Granger-Ramanathan technique can be used to compute a linear regression with the historically realized values of the target series as the dependent variable and with the historical cluster means (or medians) as the independent variables. The result is an optimal linear forecast combination of the cluster values.

Numerous other nonlinear functions can also be implemented. A particularly useful nonlinear forecasting combination method which allows for regime switching can be implemented as follows. Use the same dependent and independent variables as in the linear method described above. In addition, allow for the forecast combination weights to vary as functions of other forecasts as well as other cluster statistics.

If the coefficient on the i-th forecast is $\beta i$, then $\beta i$ is a constant in the linear model but is a function here. One implementation is as follows:

$$\beta i = (\alpha 0 + \alpha 1 *(\text{mean}i - \text{median}i > \phi i)*(\text{mean}i - \text{median}i) + (\alpha 2 *(\sigma i) + \alpha 3 *(\sigma i)^2)*(\sigma i > \Omega i) + (\alpha 4 *(\text{Forecast Change in Stock Index} > \Sigma i)) + (\alpha 5 *(\text{Forecast Change in Stock Index} < \Sigma' i))) + \ldots$$

where $\Sigma i$, $\Sigma' i$, $\phi i$, and $\Omega i$ are iteratively estimated threshold parameters, $\sigma i$ is the measure of dispersion within the i-th cluster, and $\text{mean}i$ and $\text{median}i$ are the mean and median of cluster i's forecasts. In this model, the combination weight for cluster i begins with its linear weight, which is adjusted by the difference between the mean and the median (one measure of asymmetry in the forecast distribution) if the difference exceeds some threshold, by the first two terms of a Taylor series expansion with respect to dispersion, if dispersion exceeds some threshold, and by a shift factor if the expected stock market change either exceeds or falls below separate threshold levels. Additional terms in the coefficient equation can include the Expected Uncertainty Measure, higher moments of the cluster forecast distribution, and/or the magnitude of historical forecast errors.

In step 196, it is determined whether a new combination forecast is required for a particular category. If so, in step 198 the participants whose predictions are to be used in the combination are sorted into clusters, preferably based on the most recent clusterization for the particular variable under consideration and (for participants who were not included in that clusterization) by using the assignment formulas calculated in step 191. In certain embodiments, it is possible to exclude certain new participants in cases (i.e., certain combinations of personal characteristic data) where it has been determined that the assignment formulas are less reliable at assigning participants to the appropriate cluster and to include new participants only within personal characteristic regions where the results from the assignment formulas and from the forecast-based clusterization are more highly correlated. Alternatively, it is also possible to sort all the participants into clusters based on the assignment formulas. Upon completion of such sorting, steps 193 and 195 are repeated.

In step 199, it is determined whether clusterization is required. This will be the case where a combination forecast is desired for a new category. Re-clusterization also preferably will be performed periodically for existing categories so as to reflect changing attitudes, etc., with the interval between re-clusterization being determined empirically. If clusterization is required, the process returns to step 190.

In addition to use in connection with combination forecasting, the relating of the relative statistical weight of each cluster to its associated demographics, if any, may also provide powerful marketing information about which demographics have the highest contribution to forecast accuracy. For example, one could use such information to target job candidates or new participants for the forecasting contest.

Forecasting Using Interpolation Modeling

By utilizing interpolation model forecasts, the combination forecasts calculated using the technique described above can be used to forecast other variables not specifically forecasted or can be used when the number of participants submitting predictions for such other variables is insufficient to provide a statistically meaningful combination forecast. Specifically, a price interpolation model can be fit for a variable, such as a common stock price or other asset price, based on contemporaneously available forecasts of other variables (e.g., prices of other stocks but not the target stock). The resulting interpolation model forecast provides a baseline forecast given stable relations in the market and can be used to provide initial stock forecasts.

This approach estimates the value of a particular variable (e.g., the price or value of an asset) using regression analysis and independently produced forecasts for other variables (referred to herein as predictor variables). Initially, a regression technique (preferably, stepwise linear regression) is performed to find a best fit between previously predicted values for the predictor variables (which are different from the target value) and the historical realized values for the target variable. Preferably, the previously predicted values for the predictor variables (such as previous combination forecasts for those variables) are predicted for time points that are the same, or at least contemporaneous with, the time points associated with the historical values of the target variable.

Upon completion of the regression analysis, it may be decided to utilize some or all of the predictor variables to predict the value of the target variable, based on how closely the predictions for each predictor variable were correlated with the historical values of the target variable. For example, where the correlation is below a specified minimum threshold, the subject predictor variable may automatically be excluded. Currently predicted values for the remaining predictor variables (such as current combination forecasts) are then plugged into the forecast model corresponding to the regression technique utilized, together with the parametric values identified when performing the regression analysis (e.g., weighting coefficients), in order to obtain a forecast for the target variable.

Thus, if there are (n+m) stocks being considered for forecasting, (n+m−1) stocks can be considered as possible predictors for the (n+m)-th stock. For example, a data matrix can be created in which the first column is comprised of the historical values actually observed for the target stock (with each row associated with a unique observation period). The remaining columns can then be populated with forecasts for each of the other predictor candidates, such that the forecasts are associated with realizations in the same time period as the target variable. Stepwise linear regression is then applied to identify the n stocks of the (n+m−1) predictor candidates which provide the best fit to the realizations of the target.

The resulting Interpolation Pricing Model (IPM) uses the forecasts of the n stocks to produce a forecast of the (n+m)th stock. In this fashion, quasi-consensus forecasts for a large number of stocks can be computed without the need for a specific forecast from the forecasting panel. This quasi-consensus forecast will likely not be as reliable as a forecast obtained using true consensus methods. In part, the quasi-consensus forecast is based just on "non-firm-specific" information, the price information which is common to the industry (or those securities found to be most related to the target stock). To the extent that individual stock forecasts include components associated with firm-specific information, these individual stock forecasts will tend to be more accurate than the Interpolation Pricing Model. When both types of forecasts are available, the difference between the two forecasts is a measure of the prediction of the present value of firm-specific information; it indicates the amount by which the stock in question is expected to over-perform (under perform) the industry. Thus, the interpolation model forecast can be used to provide additional information even about variables for which there are an adequate number of participants submitting predictions.

As indicated above, the forecast error in the IPM will be due primarily to firm-specific information, both anticipated and unexpected. The forecast error in the consensus forecast is due primarily to unexpected firm specific information. Therefore, the Expected Unique Information Measure is the difference between the median consensus forecast and the Interpolation Model Forecast, a dollar estimate of the present value of the expected firm specific information.

The Firm Specific Information Measure is the difference between the realized value and the Interpolation Model Forecast, e.g., for stock pricing applications, a dollar estimate of the present value of the actual firm specific information. The Unexpected Firm Specific Information Measure is the difference between the realized value and the median consensus forecast. Each of these measures allows for parsing new information into expected versus unexpected, and firm-specific versus industry-wide. Such parsings are important for financial analysis of the impact of information such as in the litigation of securities fraud class action suits.

However, the IPM can be useful even when there is not an independent consensus forecast for comparison. The IPM can act as a surrogate forecast. Using the interpolation model forecasts, quickly updated consensus based forecasts can be computed even for stocks and indices which have inadequate current forecast participation.

The estimation of the stepwise linear regressions used to form the Interpolation Pricing Model can be accomplished using many standard computer programs, including Systat. The comparison of forecast errors can be accomplished using many standard computer programs including Excel and Systat. Similarly, the computation of the IPM forecasts can be readily performed using a hand calculator, spreadsheet, or statistical program such as Systat.

The IPM forecast should do better than traditional stock forecasts because of the flexibility inherent in the underlying consensus forecasts (people can adjust their predictions more quickly than a computer algorithm can be recomputed). However, ordinarily one would not expect the IPM forecast to exceed quality consensus forecasts because of the different roles played by expected firm-specific information.

Additional Statistical Measures

In addition to providing combination forecasts using clusters, as described above, a number of other statistical measures preferably are calculated from the database of predictions. Such measures might include, for example, any or all of the following.

Overall median forecasts for each of the dozens of variables predicted in the games and the Special Challenges. This statistic can be calculated over all forecasters, over all participants in each Universe, or for various other groups of participants. It can function as one measure of central tendency.

Expectational Uncertainty Measure (EUM): (85th percentile—15th percentile)/Median—this provides a measure of the value of the uncertain range around the forecast expressed as a percentage of the group forecast; this can be monitored overtime and used to indicate breaks in expectational information. Note that the statistic ranges from zero (with no difference between the 85th and 15th percentiles) to potentially infinity. This statistic can be calculated over all forecasters, over all participants in each Universe, or for various other groups of participants. It can function as a measure of dispersion of the subject predictions.

Expectational Uncertainty Measure per Thousand: the EUM computed for every thousand forecasts.

Intraday EUM Oscillator: the ratio of the EUM of the most recent thousand forecasts to the EUM for the current daily overall (equal to 1 for the initial 1000 forecasts).

Mean time per thousand forecasts: a flow indicator showing how frequently forecasts are being updated.

Mean percentage change within day: a measure of the average percentage by which current-day entries have been adjusted from yesterday's final value to today's current value; this is a measure of perceived new information content.

Recent absolute percentage change per thousand: the absolute value of the percentage change from the previous thousand's median to the current thousand's forecast median; this is a measure of intraday stability of the forecasts.

C-Squared Statistic: the forecast "confidence" statistic; for any individual projection, take the absolute value of the revision from the previous day's entry to today, and divide this by the sum of sequential absolute revisions for each revision during the day. Square the ratio. Note that each "revision" is compared to the previous observed value in the day. If there are no revisions from yesterday, then C-Squared is defined to be 1. If there is only a single revision from yesterday to today, then C-Squared will equal 1; if there are numerous revisions, but all in a "monotonic" path, C-Squared will equal 1. If there are numerous nonmonotonic revisions, then C-squared will approach zero. C-Squared is an indicator of the stability of information. For example: yesterday's final forecast was 10; today began with 9, then finished at 12. The C-Squared statistic is:

$$(|12-10|/(|9-10|+|12-9|))^2 = (2/(1+3))^2 = \tfrac{1}{2} * \tfrac{1}{2} = \tfrac{1}{4}.$$

L- Statistic: a "leakage" measure, equal to 1/C. Take the sum of the absolute revisions from the previous day's entry to the first of today's, the first of today's to the second, and so on; this is the ratio's numerator. The denominator is the absolute revision from yesterday's final value to today's final value.

Intraday forecast median trajectory: compute the intraday forecasting patterns, looking at the median per thousand forecasts, expressed in a percentage basis with previous day's overall median as 100.

Intraday Forecast Oscillator—compute the ratio of the median of the most recent thousand forecasts to the current daily median overall (equal to 1 for the initial 1000).

Forecast Momentum Index: the recent absolute percentage change per thousand divided by the mean time per thousand forecasts. As there is little change in the median forecast, the Forecast Momentum Index goes to zero; as there is little forecasting activity, the Forecast Momentum Index goes to zero. As there is either a large change in the median or a large change in frequency of forecasting, the Forecast Momentum Index grows and can go to infinity.

Market Volatility Measures: the standard deviation of the forecasts of the various market indexes; this could be a rolling average of standard deviations per thousand forecasts, or it could be an actual calculation based on all the current forecasts active during the given day. The Forecast Volatility Curve is the plot of the standard deviations across the forecast horizon, preferably from the end of next week to a year from now. Note that statistical curve fitting methods (e.g. nonlinear curves, cubic splines) can be applied to interpolate the relevant volatility measure for any time horizon along the curve given the key points included in the samples.

Enthusiasm Statistics: first generate median forecasts for each of the variables by each of the teams in the Challenge and an overall median; next, generate median forecasts according to geographic groupings and also according to other demographic variables. The ratio of the median by the subgroupings to the overall median is a measure of relative confidence or enthusiasm.

It is noted that the L-Statistic, C-Squared Statistic, and the Forecast Oscillators can be applied to other time horizon situations as well. Breaks in the L-Statistic and the C-Squared Statistic values indicate changes in forecast sentiment, and may indicate other regime shifts; significant breaks (i.e., changes that meet some predetermined criteria, such as a predetermined threshold) can be reported through the email and pager alert services.

The following example will illustrate what one set of forecasts might look like as measured over two days and will also illustrate how several of the unique statistics described above can help interpret the evolution of the forecast data. Note that these are artificially constructed data for example purposes; while it is possible that real data would display these instabilities and rapid adjustments, it is likely that there would be significantly less intraday forecast revision than is displayed in this example.

Suppose that the forecast deciles are listed below in the left column, and the observation periods are listed across the columns. The table entries might be the medians associated with the particular forecast decile as of the forecast date:

Example Forecast Distribution Data

| | | | | Observation | | | | | |
|---|---|---|---|---|---|---|---|---|---|
| percentile = | PREV. CLOSE | OPEN Day 1 | 10 AM | NOON | 4 PM | CLOSE Day 1 | OPEN Day 2 | NOON | CLOSE Day 2 |
| 0.10 | 75.76 | 79.41 | 82.07 | 84.60 | 86.89 | 88.51 | 90.14 | 91.52 | 92.76 |
| 0.15 | 76.90 | 80.21 | 82.84 | 85.21 | 87.45 | 89.00 | 90.60 | 91.88 | 93.06 |
| 0.20 | 77.75 | 80.91 | 83.53 | 85.67 | 87.93 | 89.44 | 90.96 | 92.21 | 93.32 |
| 0.30 | 79.18 | 82.28 | 84.54 | 86.78 | 88.79 | 90.11 | 91.58 | 92.75 | 93.75 |
| 0.40 | 80.78 | 83.97 | 85.77 | 87.84 | 89.79 | 90.83 | 92.29 | 93.32 | 94.30 |
| 0.50 | 113.69 | 113.92 | 88.29 | 90.45 | 108.51 | 92.09 | 93.76 | 94.53 | 104.28 |
| 0.60 | 118.97 | 116.46 | 114.08 | 112.05 | 110.48 | 108.69 | 107.59 | 106.57 | 105.72 |
| 0.70 | 120.84 | 117.88 | 115.25 | 113.16 | 111.37 | 109.58 | 108.28 | 107.21 | 106.21 |
| 0.80 | 122.44 | 119.11 | 116.38 | 114.27 | 112.25 | 110.38 | 108.93 | 107.75 | 106.67 |
| 0.85 | 123.17 | 119.86 | 117.04 | 114.71 | 112.68 | 110.79 | 109.28 | 108.06 | 106.96 |
| 0.90 | 124.10 | 120.68 | 117.77 | 115.37 | 113.21 | 111.26 | 109.62 | 108.44 | 107.32 |
| 1.00 | 135.15 | 129.62 | 125.41 | 122.46 | 117.99 | 115.50 | 113.04 | 111.12 | 110.04 |

The meandering of the forecast itself is clear to anyone who has watched a stock ticker. The forecast at the previous close was 113.69; the forecast began up a little, ending the day at 92.09. The next morning, the forecast opened a little higher, then rose steadily throughout the day, closing at 104.28. As a measure of market expectations, this forecast series could be quite enough. However, there is much more that one can glean from the forecast distribution data.

First, the Expectational Uncertainty Measure (EUM) can be used to measure whether there is a convergence or divergence in the forecast marketplace over time. The initial EUM (for the previous day's close) is computed to be 40.7%. By 4:00 p.m. on day 1, the EUM has dropped to 23.3%. Note that although there is a major change in the forecast from 4:00 p.m. to Close, from 108.51 to 92.09, the EUM remains almost constant at 23.6%.

The Expectational Uncertainty Measure indicates that some of the change in forecast from the previous close to the 4:00 p.m. value might be due to a tightening of the forecasts, rather than to significant new information. However, the forecast change from 4:00 p.m. to Close, accompanied by a nearly constant EUM, is directly attributable to new information which had a uniform impact across forecasters. The forecasters are collectively more certain by Day 1 Close than the previous day, and have incorporated new information into their collective prediction. Day 2 opens with an EUM of 19.9% and closes with an EUM of 13.3%. Whatever the resulting value, the forecasters have a tighter distribution.

The C-Squared statistic gives a measure of the net movement of forecasts within a forecast period. It might be viewed as a measure of the directional efficiency of information in the marketplace. By construction, so long as all forecast changes continue in the same direction (e.g. continued downward revision or continued upward revision), the C-Squared statistic equals 1. Information may not be appearing instantaneously, as predicted by some financial theories, but at least what information is arriving continues in the same direction as predecessor information. To the extent that the forecasts see-saw throughout the day, there will be far more movement than actual end of the day net change. In such a case, the directional efficiency of the forecasts would be quite low, and the C-Squared statistic would approach 0 in value.

In the above example, Day 1 began with C-Squared equaling 1, by definition. The next observation, 10:00 a.m., produces a C-Squared of 96.4% as the forecast has dropped to its example low of 88.29. The statistic shows that about 3.6% of the movement happened from close to open, but that most of the forecast movement happened between open and the 10:00 a.m. measurement. As the forecasts start increasing, the large drop to 88.29 is increasingly revealed as a detour, detracting from directional efficiency. By noon, the C-Squared has dropped to 69% and continues its plummet, reaching 1.2% by 4 p.m. However as the median forecasts drop further, the C-Squared recovers somewhat to 12%.

The C-Squared Statistic together with the EUM Statistic indicate that there was significant, confused information being incorporated into the forecasts, but it was accompanied by a tightening of the forecast distribution even as wildly changing forecasts were being produced. In other words, the market was increasingly moving together even while being whipsawed by whatever was causing the forecast jumps.

Pricing Derivative Instruments

One application of the internet-based consensus forecast is in the direct estimation of the statistical distribution associated with the market expectations of future outcomes. These distributions, directly measurable from the prediction database, are able to be applied as the a priori and the a posteriori distributions (for updating) in Bayesian estimators. An aspect of the present invention is the application of these empirically derived distributions to Bayesian estimators in the initialization, training, and operation of neural networks, of Bayesian neural networks, of adaptive filters, and of mixed estimation econometric models.

These forecast distributions are also directly applicable to the estimation of various volatility measures, for options estimation purposes (as described below), and of broad classes of market sentiment measures, including submeasures according to various groupings of the forecast participants. For example, one could evaluate the market sentiment for those in urban East Coast in contrast to those in the rural Northern United States.

Utilizing an enormous longitudinal database according to the present invention also can permit one to obtain fairly accurate measurements of certain quantities, which previously had to be estimated in a more indirect manner. Consider the problem of pricing a three-month call option on a stock currently selling at $50 if the exercise price (EP) is $55 (i.e., an "out the money" option). Existing pricing models require an estimate of the variance of the stock price over the next three months. Conventionally, historical data have been used to make this estimate. Thus, in a changing market, such conventional techniques are often inadequate. Moreover, these conventional models typically also assume that both the stock and the option trade in efficient markets. Hence, the expected price of the stock is assumed to rise over time only at some equilibrium rate of return. Assume that this rate is 8%, such that the expected price of the stock in 3 months is $51. Suppose further that information became available indicating that the value in 3 months should be $55. Under the efficient market assumption, the stock would immediately jump from $50 to (about) $54 and the price of the (now less "out of money") call would jump correspondingly to re-establish the option pricing model relationship. Hence, the traditional view is that an increase in the expected return on the stock will cause both the stock price and the option price to rise, while an increase in the variance of the stock return will only cause the option price to rise (and may cause the stock price to fall—which would moderate the option price rise).

According to the present invention, however, there is available a large number of estimates of the stock price at various time points throughout the three-month period. The resulting distribution for any given time point, with the percentage of total number of forecasts on the vertical axis and the stock price on the horizontal axis is at least an estimate of the probability distribution function for the stock price during that time point. Hence, it is generally not necessary to use historical data to compute the future variance because the appropriate price for the option can be computed directly. Specifically, an estimate of the current price for the option can be determined by computing the area under the forecast distribution above the EP and taking a present value.

Depending partly upon the actual number of predictions available, it may be more accurate to aggregate all predictions over the three-month period or to subdivide the three-month period into shorter time intervals (whose length also depends upon the number of predictions). In the latter case, the option price can be estimated with respect to each shorter time interval, and then the maximum price so obtained (possibly after discarding certain outliers) can then be adopted as the option's true price. While this technique might provide more accurate estimates where a large number of predictions are available, if the number of predictions is smaller it may be difficult to subdivide (or to subdivide beyond some minimum time period) and still obtain statistically meaningful results. In any event, by comparing the option pricing model's implied variance to the value computed according to the present invention, or simply the current option price to the value computed according to the present invention, we can identify potentially over (or under) priced options.

Nor is this all. One of the original reasons to get the stock price forecast was to try to identify stocks expected to under or over-perform. In other words, the procedure according to the present invention generally is not wedded to an assumption of market efficiency. We are thus able to allow both the stock and the option to be inefficiently priced and further determine (based upon the same—and hence at least consistent—forecast distribution) which is more inefficiently priced. This result will have clear implications for hedging (e.g., long one and short the other).

The foregoing discussion can be easily extended to the valuation of other derivative instruments (i.e., instruments whose value depends upon the value of an underlying asset on a future date or dates). Specifically, by assuming that the distribution of forecasts for the value of the underlying asset at a given point in the future is the same as the probability density function for the asset's value at that point in time, it becomes a straightforward matter to determine the probability that the underlying asset will have any particular price at that point in time. It also generally will be a simple matter to determine the value of the derivative instrument if the underlying asset is assumed to have a given value at a given point in time. For example, in the call option example given above, the value of the derivative instrument is equal to the assumed value of the underlying stock minus the exercise price or zero, whichever is greater, discounted to present value. Accordingly, the derivative can be priced as follows:

$$D = \sum_{all-UA} D(UA) * P(UA)$$

where D is the value of the derivative instrument, UA is the assumed value of the underlying asset on the future date, D(UA) is the derivative's value given UA, and P(UA) is the probability of UA. It is noted that all possible values of UA can be used or else a coarser selection of discrete values of UA can be used, e.g., with each forecast being deemed to be the permissible value of UA to which it is closest.

Because the value of many derivative instruments will depend not only on the value of the underlying asset at a single point in time, but rather over a range of times, the foregoing calculation can be repeated for a number of different time points in the applicable period. Then the value of the derivative instrument can be set to be the maximum over all such time points or can be selected in any other manner. For example, other techniques which take into account the likely risk in waiting to exercise the applicable rights under the derivative instrument, as compared to the likely reward in doing so, may be more optimal (i.e., biasing toward earlier exercise).

Additional Analytical Techniques

A variety of additional sophisticated techniques based on the collected forecast data-warehouse, such as products based on cointegration techniques, can also be provided. Cointegration techniques are statistical methods used for the analysis of highly correlated data series such as stock prices. Several examples of such additional techniques are as follows.

First, based on the distributions of the consensus estimates for the interest rate series, confidence bands can be estimated around the specified points on the yield curve for each of the future time horizons. With statistical curve fitting methods, a nonlinear yield curve can be estimated through the forecast points. With the empirical forecast distributions, one can perform resampling to estimate the confidence surfaces for any desired percentile. As a result, far better Value at Risk and bond-pricing analysis can be performed. Similarly, far better Value at Risk analysis for complicated derivatives and hedge products can be performed.

Based on the results of the periodic Special Challenge requesting the relative ranking of various types of investments, the resulting ranks can be matched against the participants' demographic variables in the database to provide investment allocation suggestions. Based on the expected price distributions for long term forecasts, a nonlinear optimization algorithm can be used (such as a genetic algorithm) to determine optimal portfolios given specific constraints and objectives. For example, applying a genetic algorithm model to these data will quickly identify the least risk portfolio for a given amount of new money investment, the maximum return portfolio, and the maximum return in given stock sectors. By integrating the Premium Sites with the forecast predictions, bonds and cash can also be included in the optimal portfolios. The application of the genetic algorithm to consider the forecast risk as measured by the consensus panel provides a powerful solution.

Using randomly assigned clusters, stepwise regression can be applied to the realization series and the historical predictions and errors for each of the forecasters in these random clusters. The regression results will identify candidates for an "individual-based" model. The identified candidates can then be included in a large group which also can be analyzed using stepwise regression to identify an appropriate set of regressors. In this manner, improved forecasts can often be provided by using historical weighting of the predictions of individual participants.

Traditional neural networks can be spectacular at finding patterns in the realization of data, but they require significant internal stability in the system being predicted because of the great length of time to train the network. Bayesian Neural Networks (BNNs) allow for the use of a priori statistical distributions on possible outcomes to train the network more efficiently. There are numerous innovative ways that the empirical forecast distributions associated with the present consensus panel can improve the performance of neural network systems. By using the forecast distributions across multiple time horizons, the Premium Site consensus panel allows for the simultaneous estimation of a priori and a posteriori distributions in advance of the realization. The neural network can be trained using the repeated forecast horizons as repeated iterations for training purposes, allowing the neural network to be trained to respond to newly perceived market relations far more quickly than in traditional models. Moreover, beside providing forecasts, the BNN approach can be used to determine improved combination weights for real time reweighting of the consensus panel.

Another artificial intelligence approach to determine optimal combination weights, a genetic algorithm may be run real time to reweight a forecast combination equation based on the recency of each individual's (or cluster's) predictions as well as the historical accuracy of that individual (or cluster).

In the limited z-matrix weighting regime switching model, demographic variables are used along with economic forecast variables (GNP, U, r, P) to determine nonlinear regime switching parameters for individual forecast level combination equations. Similarly, economic forecast variables can be used to determine cluster weighting.

Utilization of Banner Ad Click-Through Information

As noted above, it is common for web sites to display banner advertisements ("banner ads") that also function as hyperlinks. However, in the past very little has been done to analyze the information regarding the number of banner ads to which viewers respond ("Click-throughs"). The following describes a mechanism utilizing the click-through response information to provide additional valuable economic information.

A web site according to the preferred embodiment of the present invention internally categorizes banner ads by industry or economic group. For example, ads for mortgages would be grouped together, as would ads for automobiles. This grouping model preferably includes categories as well as sub-categories (to as many levels as necessary). Any sub-category can have multiple parent categories, and the link between sub-category and parent category preferably has a real-valued weight between 0 and 1, indicating the level of representation of the sub-category within the parent. The weights of all sub-categories under a specific parent category preferably sum to 1. This model is a weighted acyclic directed graph. As examples, "Auto Accessories" might be represented as a subset of "Auto", and "Chain Restaurant" might be represented as a subset of "Food" and also as a subset of "Franchise Businesses" (preferably, when the weights are unspecified, their default value is 1).

The web site preferably collects information on each click-through. Specifically, the number of click-throughs for each category and the number of ads for that category that were presented during a specific period (say, one week) are counted. Additionally, the data may be further subdivided into various demographic and expectational categories, such as geographic regions or a group of subscribers with certain beliefs or forecast expectations. The collection of click-through rates (click-throughs/ads presented, for each category) covering one period will then be compared to one or more prior periods (e.g., $\text{rate}_{current}/\text{avg}(\text{rate}_{previous}(i))$) to determine click-through indices which measure whether there has been a change in consumer sentiment for each category. For example, a click-through index for mortgage ads for individuals living in the Midwest that is greater than 1.0 would indicate an increasing interest in mortgages within that region. Where a category has sub-categories, the aggregate values of click-throughs and ads presented for the category are calculated by summing the products of each sub-category's weight and click-throughs or ads presented.

Additionally, the category click-through index can be compared to the click-through index for each individual ad within that category to provide independent measures of changes in market sentiment for specific products. Some example conclusions that can be drawn are:

(product click-through index)/(category click-through index)>1.0=
>Effective number of ad impressions and/or gain in market share (product click-through index)/(category click-through index)<1.0=
>Ad saturation and/or loss of market share These indices (or other functions of the click-through rates) can also be utilized as additional variables for the statistical forecasting described above. For example, models can be estimated which use changes in the indices as leading indicators for broader economic measures (e.g., mortgage click-throughs may be a leading indicator for housing starts or GNP). The indices also can provide the foundation for additional consumer sentiment measures, even to the extent of analyzing differential industry performance.

For example, click-through statistics (such as the indices described above) can be combined with the cluster statistics in order to provide enhanced combination forecasts. In this implementation, the weights assigned to the click-through statistics preferably would be determined in a similar manner as for the cluster statistics, i.e., based on the predictive accuracy of such rates in previous combination forecasts. Alternatively, click-through statistics alone could be used to generate forecasts or the click-through statistics could be combined with any other indicators to generate forecasts.

Moreover, the click-through statistics can first be separated out into click-through statistics for different demographic groups or for groups sharing other common personal characteristics (such as by using the personal characteristic information obtained in the contest registration described above). Upon doing so, it is likely that the click-through statistics for certain groups will have greater predictive accuracy than for other groups. Accordingly, by appropriately selecting the groups to use, prediction accuracy can be further enhanced. The groupings can be made using the clusters described above that are generated based on the individuals' predictions, based on ad hoc notions, or based on any other criteria.

Preferably, however, new clusters are formed in the same manner discussed above, but instead based on the correlation between the participants' click-through rates and the variations in the subject variable. This technique should result in optimal or near optimal clusterization for the intended purpose. Also, assignment formulas can be generated (in the same manner described above) for assigning new participants to these clusters for purposes of categorizing their click-through information.

Additional valuable information can be obtained by correlating: (1) click-through rates (i.e., number of click-throughs divided by the number of ads presented) or other click-through statistics with the demographic information or other personal characteristic information for the viewer; (2) click-through statistics for a viewer with the viewer's predictions; and/or (3) click-through statistics with the variable being predicted on the page on which the banner ad appears. In particular, this information can have important implications for targeting banner ads in the most effective manner.

Finally, it is preferable to maintain saturation as well as penetration information. In other words, in collecting the click-through data, it is preferable to maintain and to utilize in the statistical analyses described above data that distinguish between the same respondents clicking repeatedly on similar ads and distinct respondents clicking on similar ads. The foregoing can be accomplished, for example, by ignoring click-throughs above a certain maximum (e.g., 1, 2 or 3) for the same individual, ignoring click-throughs above a certain maximum (e.g., 1, 2 or 3) for the same individual within a predetermined period of time (e.g., 1 month), giving less weight to additional click-throughs for the same individual, or giving less weight to additional click-throughs for the same individual within a predetermined period of time (e.g., 1 month). It is noted that the foregoing techniques are preferably utilized in connection with a registration process that permits the website operator to distinguish different individuals.

Network Environment

Figure 12:
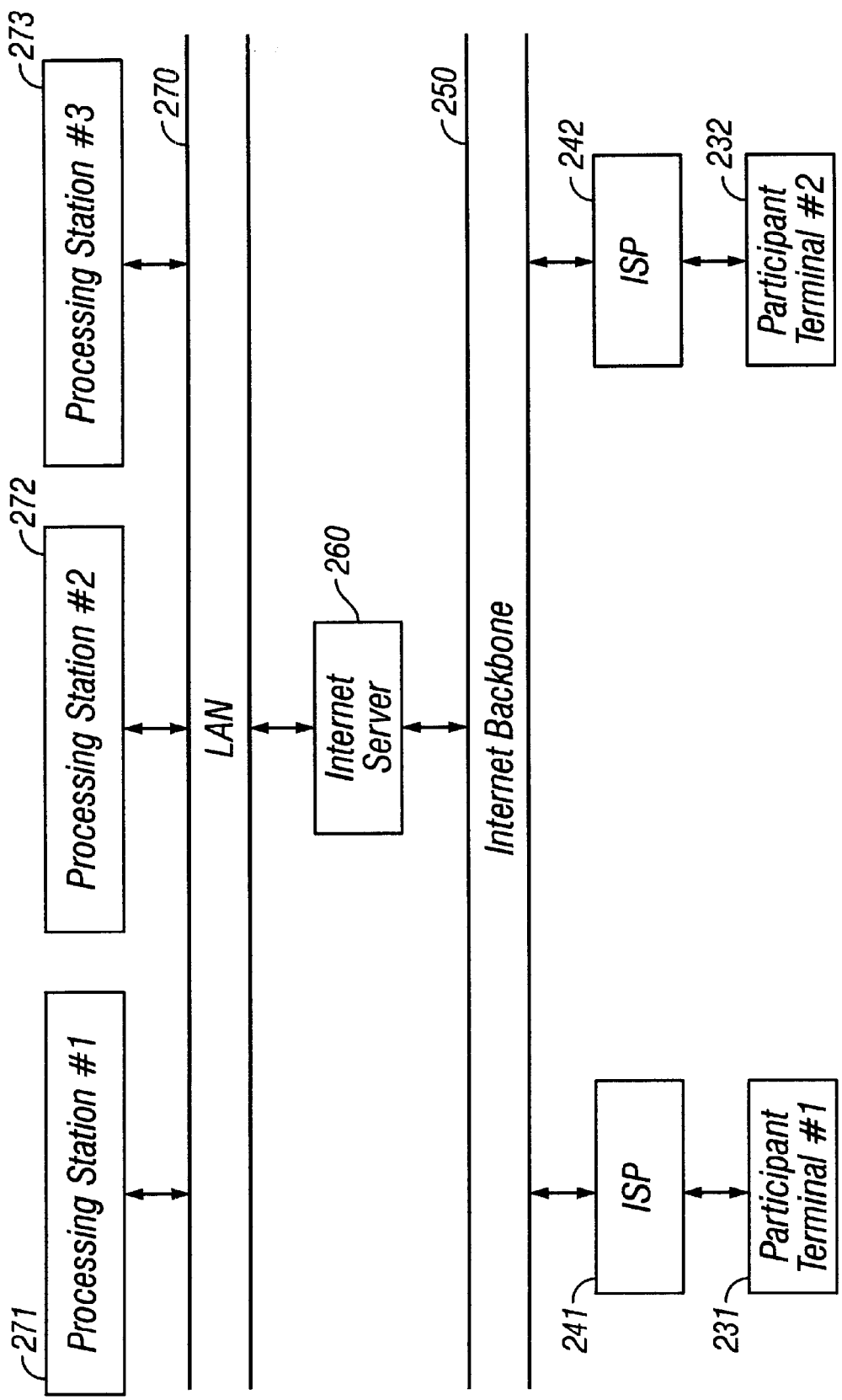
FIG. 12 illustrates a representative network environment in which the techniques of the present invention may be implemented.

FIG. 12 is a block diagram illustrating the network structure of the environment in which the present invention operates, according to one exemplary embodiment. Shown in FIG. 12 are participant terminals 231 and 232, which may comprise either an ordinary computer workstation, a laptop computer, or special-purpose computing equipment. Terminals 231 and 232 communicate with Internet service providers (ISPs) 241 and 242 via a telephone connection, such as by using a modem interface. ISPs 241 and 242, in turn, connect to Internet backbone 250 via their respective routers (not shown). Specifically, ISP 241 receives Internet messages from terminal 231 and then routes them onto Internet backbone 250. Also, ISP 241 pulls messages off Internet backbone 250 that are addressed to terminal 31 and communicates those messages to terminal 231 via the telephone connection. In a similar manner, terminal 232 also can communicate over the Internet through ISP 242.

Also connected to Internet backbone 250 is Internet server 260. As discussed in more detail below, one function performed by Internet server 260 is to interact with participant terminals, such as terminals 231 and 232, over the Internet in order to supply the participants with various informational resources and to accept prediction information from the participants. Internet server 260 then provides the prediction information, via local area network (LAN) 270, to various processing stations, such as stations 271 to 273. While Internet server 260 may be capable of performing some of the simple processing tasks, such as finding the median of the prediction data for each prediction event, the more complicated processing preferably is performed by one or more dedicated processing stations, such as stations 271 to 273.

Although terminals 231 and 232 are shown in FIG. 12 as being attached to Internet server 260 via the Internet 250, other methods can also be used for communicating between remote terminals and the Internet server 260, such as by utilizing a direct modem/telephone line dial-in connection, a wide area network, a local area network or any other communication system. Furthermore, different terminals may be connected to server 260 via different communication systems. For example, individual computer workstations might connect to Internet server 260 via the Internet 250, while terminals under common ownership with Internet server 260 might communicate with Internet server 260 via a wide area network or a direct dial-in connection. Similarly, although Internet server 260 is shown in FIG. 12 as being connected to the various processing stations using LAN 270, any other communication system may also (or instead) be used, such as a wide area network, local area network, Internet, or direct modem/telephone line dial-in connection.

System Environment

Figure 13:
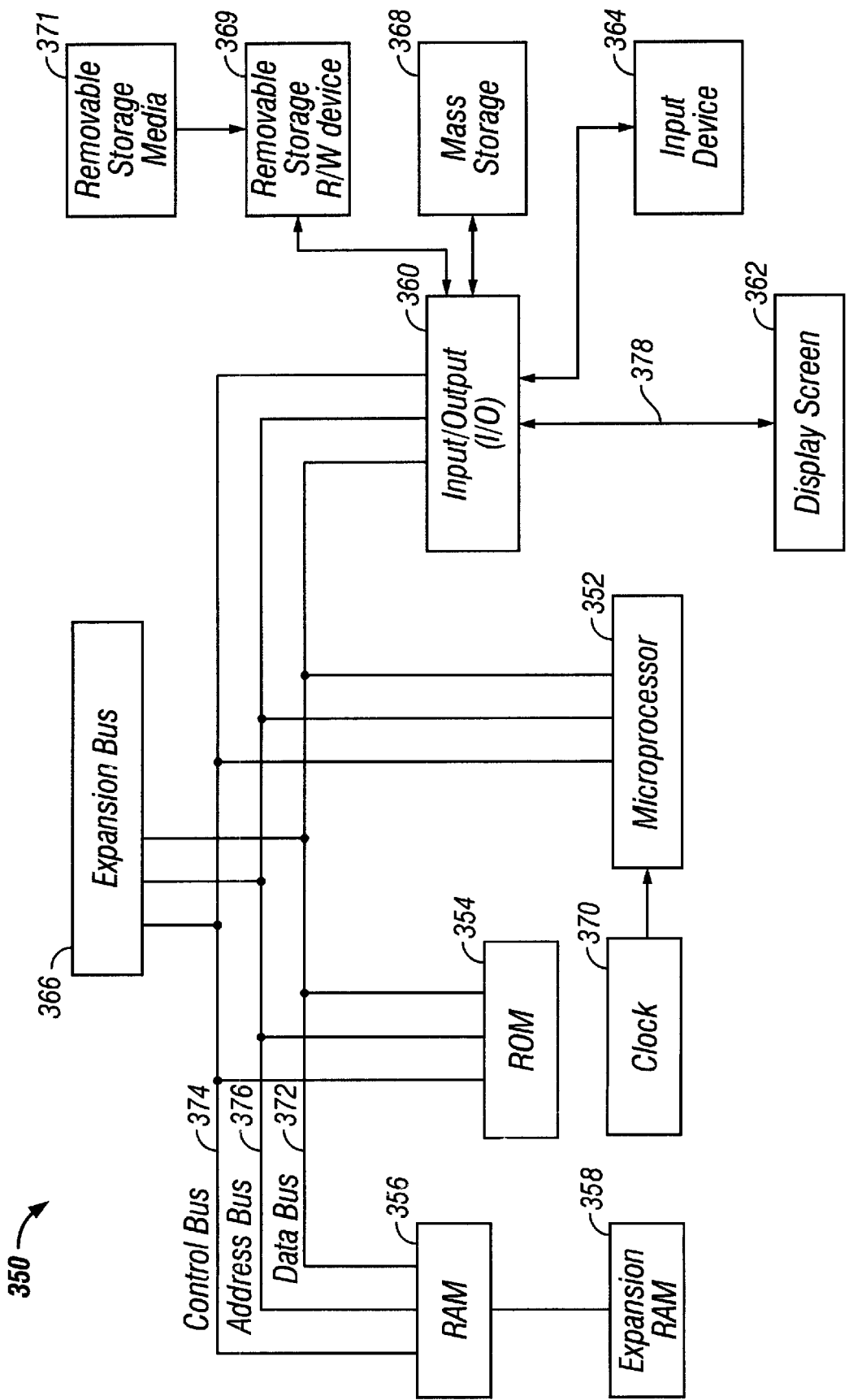
FIG. 13 illustrates a representative computer system that is one of the suitable platforms for performing computer-executable process steps to implement the techniques of the present invention.

Generally, the network nodes referenced above can be implemented either as a general purpose or a special purpose computer, either with a single processor or with multiple processors. FIG. 13 is a block diagram of a general purpose computer system, representing one of many suitable computer platforms for implementing the methods described above. Thus, the general purpose computer system illustrated in FIG. 13 might be used to implement any of processing stations 271 to 273, Internet server 260 or participant terminals 231 and 232. However, the system shown in FIG. 13 is more preferably used only for Internet server 260 and various participant terminals, such 231 and 232. Because of the intensive processing requirements, the processing stations (such as 271 to 273) preferably are implemented as multi-processor boxes having a large amount of random access memory (RAM), such as 8 gigabytes.

Specifically, FIG. 13 shows a general purpose computer system 350 in accordance with the present invention. As shown in FIG. 13, computer system 350 includes a central processing unit (CPU) 352, read-only memory (ROM) 354, RAM 356, expansion RAM 358, input/output (I/O) circuitry 360, display assembly 362, input device 364, serial port 382, modem port 384, and expansion bus 366. Computer system 350 may also optionally include a mass storage unit 368 such as a disk drive unit or nonvolatile memory such as flash memory and a real-time clock 370.

CPU 352 is coupled to ROM 354 by a data bus 372, control bus 374, and address bus 376. ROM 354 contains the basic operating system for the computer system 350. CPU 352 is also connected to RAM 356 by busses 372, 374, and 376. Expansion RAM 358 is optionally coupled to RAM 356 for use by CPU 352. CPU 352 is also coupled to the I/O circuitry 360 by data bus 372, control bus 374, and address bus 376 to permit data transfers with peripheral devices.

I/O circuitry 360 typically includes a number of latches, registers and direct memory access (DMA) controllers. The purpose of I/O circuitry 360 is to provide an interface between CPU 352 and such peripheral devices as display assembly 362, input device 364, serial port 382, modem port 384, and mass storage 368.

Display assembly 362 of computer system 350 is an output device coupled to I/O circuitry 360 by a data bus 378. Display assembly 362 receives data from I/O circuitry 260 via bus 378 and displays that data on a suitable screen.

The screen for display assembly 262 can be a device that uses a cathode-ray tube (CRT), liquid crystal display (LCD), digital flat panel, or the like, of the types commercially available from a variety of manufacturers. Input device 364 represents one or more of a keyboard, a mouse, a magnetic card reader, a bar code reader, a stylus working in cooperation with a position-sensing display, or the like. The aforementioned input devices are available from a variety of vendors and are well known in the art.

Some type of mass storage 368 is generally considered desirable. However, mass storage 368 can be eliminated by providing a sufficient mount of RAM 356 and expansion RAM 358 to store user application programs and data. In that case, RAMs 356 and 358 can optionally be provided with a backup battery to prevent the loss of data even when computer system 350 is turned off. However, it is generally desirable to have some type of long term mass storage 368 such as a commercially available hard disk drive, nonvolatile memory such as flash memory, battery backed RAM, PC-data cards, or the like.

A removable storage read/write device 369 may be coupled to I/O circuitry 360 to read from and to write to a removable storage media 371. Removable storage media 371 may represent, for example, a magnetic disk, a magnetic tape, an opto-magnetic disk, an optical disk, or the like. Instructions for implementing the inventive method may be provided, in one embodiment, to a network via such a removable storage media.

In operation, information is input into the computer system 350 by, for example, swiping a magnetically encoded or bar-coded card through an appropriate card reader, typing on a keyboard, manipulating a mouse or trackball, or "writing" on a tablet or on position-sensing screen of display assembly 362. CPU 352 then processes the data under control of an operating system and an application program, such as a program to perform steps of the inventive method described above, stored in ROM 354 and/or RAM 356, typically after downloading the program from mass storage 368. CPU 352 then typically produces data which is output to the display assembly 362 to produce appropriate images on its screen.

Expansion bus 366 is coupled to data bus 372, control bus 374, and address bus 376. Expansion bus 366 provides extra ports to couple devices such as network interface circuits, modems, display switches, microphones, speakers, etc. to CPU 352. Network communication is accomplished through the network interface circuit and an appropriate network. For example, the network interface circuit can connect through a hub (not shown) into an external router (not shown) for communication over a local area network, a wide area network or the Internet. Serial port 382 is coupled to input/output circuitry 360 and can provide external communication for computer system 350.

Modem port 384 is coupled to input/output circuitry 360 and also can provide external communication for computer system 350. For example, by utilizing an internal modem (not shown) in input/output circuitry 360 and connecting modem port 35 384 to an external telephone line (not shown), computer system 350 can connect to various modem-based computer dial-up systems, including systems provided by Internet service providers, which subsequently can connect computer system 350 to the Internet.

Suitable computers for use in implementing the present invention may be obtained from various vendors. Various computers, however, may be used depending upon the size and complexity of the tasks. Suitable computers include mainframe computers, multiprocessor computers, workstations or personal computers. In addition, although a general purpose computer system has been described above, a special-purpose computer may also be used.

It should be understood that the present invention also relates to machine readable media on which are stored program instructions for performing methods of this invention. Such media include, by way of example, magnetic disks, magnetic tape, optically readable media such as CD ROMs, semiconductor memory such as PCMCIA cards, etc. In each case, the medium may take the form of a portable item such as a small disk, diskette, cassette, etc., or it may take the form of a relatively larger or immobile item such as a hard disk drive or RAM provided in a computer.

CONCULSION

The business model of the present invention is certainly not limited to the economic and financial data of the developed world. Suppose one wished to estimate the GNP of Nigeria (or Cuba), where few records are kept and few of those are reliable. The consensus approach would certainly be cheaper, and probably more reliable, than the alternatives.

In addition to estimation of commodity spot and futures prices, the above techniques can also be used in connection with crop forecasting. Going farther afield, forecasting of consumer and/or societal trends, such as popularity of different colors (for cars, appliances, etc.) or individual movies also can be forecast in a manner which could be improved by the inventive methods described above.

Finally, the act of repeated surveys of a population of known identity and demographics has numerous interesting marketing applications, the least of which is targeted banner ads. Testing the evolution of new product reaction (through ads and/or surveys with cBuck incentives) would seem to offer great potential, particularly if the response information were analyzed in connection with the collected personal characteristic information.

Generally speaking, the present invention provides an overall solution for gathering longitudinal prediction data and then processing that data to provide statistical estimates of various quantities. As described in more detail above, the data gathering aspect of the invention is implemented as a prediction contest, and can provide incentives for a large number of people and entities to participate on a frequent basis. For example, in a preferred embodiment of the invention, participants are ranked and/or rewarded based on track record over a period of time. In this way, participants have significant incentives to provide accurate predictions, as contrasted with many conventional contests which may encourage gamesmanship by rewarding a participant based on prediction accuracy with respect to discrete events, irrespective of how poorly the participant may have done in previous events. A number of different inventive features are included within this solution.

Thus, although the present invention has been described in detail with regard to the exemplary embodiments and drawings thereof, it should be apparent to those skilled in the art that various adaptations and modifications of the present invention may be accomplished without departing from the spirit and the scope of the invention. Accordingly, the invention is not limited to the precise embodiments shown in the drawings and described in detail hereinabove. Rather, it is intended that all such variations not departing from the spirit of the invention be considered as within the scope thereof as limited solely by the claims appended hereto.

Also, several different embodiments of the present invention are described above, with each such embodiment described as including certain features. However, it is intended that the features described in connection with the discussion of a single embodiment are not limited to that embodiment but may be included and/or arranged in various combinations in any of the other embodiments as well, as will be understood those skilled in the art.

In the following claims, those elements which do not include the words "means for" are intended not to be interpreted under 35 U.S.C. §112¶6.

What is claimed is:

1. An apparatus for facilitating the entry of prediction data for a variable, comprising:
    display means for electronically displaying a graph, the graph including a historical portion that includes historical values of the variable over time and also including a future portion;
    designation means for designating a point on the future portion of the graph; and
    prediction entry means for converting the point designated by said designation means into a predicted value for the variable at a realization time,
        wherein each of the predicted value and the realization time are based on a position of the point.

2. An apparatus according to claim 1, wherein the graph also shows historical values for other variables.

3. An apparatus according to claim 1, further comprising means for entering an estimate regarding uncertainty of the predicted value.

4. An apparatus according to claim 3, wherein said means for entering an estimate regarding uncertainty of the predicted value permits selection of one of a discrete number of uncertainty indicators.

5. An apparatus according to claim 3, wherein said means for entering an estimate regarding uncertainty of the predicted value permits designation of uncertainty within a continuous range of degrees of uncertainty.

6. An apparatus according to claim 1, wherein said designation means comprises a computer mouse.

7. An apparatus according to claim 1, further comprising additional display means for graphically displaying the historical data and the predicted value for the variable with respect to a different independent variable than in the graph.

8. An apparatus according to claim 7, wherein said display means displays the historical data for the variable in a time series view.

9. An apparatus according to claim 8, wherein said display means displays the historical data for plural different variables in a time series view, and wherein said additional display means displays the historical data for said plural different variables in a rotation of the time series view.

10. An apparatus according to claim 7, wherein said additional display means also permits modification of the predicted value by alteration a location of a point corresponding to the predicted value.

11. An apparatus according to claim 1, further comprising downloading means for downloading the historical data for the variable from a server across an electronic network.

12. An apparatus according to claim 11, wherein said downloading means specifies a desired granularity for the historical data of the variable.

13. An apparatus according to claim 11, wherein said downloading means specifies a desired time interval for the historical data of the variable.

14. An apparatus according to claim 1, wherein said display means comprises means for indicating a division between the historical portion and the future portion of the graph.

15. An apparatus according to claim 1, further comprising a numeric input means for alternatively entering the predicted value in numeric form.

16. An apparatus according to claim 1, further comprising means for numerically displaying the predicted value after the point has been designated and for permitting numerical alteration of the predicted value.

17. An apparatus according to claim 1, wherein plural points may be designated on the graph corresponding to predicted values for the variable at plural different realization times.

18. An apparatus according to claim 1, further comprising means for highlighting a current position on the graph tentatively designated by said designation means, and means for obtaining data linked to said current position.

19. An apparatus according to claim 1, further comprising means for matching the predicted value to different prediction models and identifying a closest prediction model.

20. An apparatus according to claim 19, further comprising means for providing information regarding data implicit in the predicted value, based on said closest prediction model.

21. An apparatus according to claim 1, further comprising means for providing an additional graph of a requested mathematical transformation of data.

22. An apparatus for facilitating the entry of prediction data for a variable, comprising:
- display means for electronically displaying a graph, the graph including a historical portion that includes historical values of the variable over time and also including a future portion;
- designation means for designating a point on the future portion of the graph;
- prediction entry means for converting the point designated by said designation means into a predicted value for the variable at a realization time, wherein each of the predicted value and the realization time are based on a position of the point;
- numeric entry means for numerically displaying the predicted value after the point has been designated and for permitting numerical alteration of the predicted value; and
- additional display means for graphically displaying the historical data and the predicted value for the variable with respect to a different independent variable than in the graph,
    - wherein said additional display means also permits modification of the predicted value by altering a location of a point corresponding to the predicted value.

23. An apparatus according to claim 22, wherein the graph also shows historical values for other variables.

24. An apparatus according to claim 22, further comprising means for entering an estimate regarding uncertainty of the predicted value.

25. An apparatus according to claim 22, further comprising a numeric input means for alternatively entering the predicted value in numeric form.

26. A method for entering prediction data for a variable, comprising:
- causing a graph to be electronically displayed, the graph including a historical portion that includes historical values of the variable over time and also including a future portion;
- designating a point on the future portion of the graph, a position of the point corresponding to a predicted value for the variable at a realization time and to the realization time;
- entering the predicted value; and
- numerically altering the predicted value after designating the point but before entering the predicted value.

27. A method according to claim 26, further comprising a step of entering an estimate regarding uncertainty of the predicted value.

28. A computer-readable medium storing computer executable process steps, said process steps for facilitating the entry of prediction data for a variable, said process steps comprising steps to:
- electronically display a graph, the graph including a historical portion that includes historical values of the variable over time and also including a future portion;
- permit designation of a point on the future portion of the graph; and
- convert the point designated by said designation means into a predicted value for the variable at a realization time,
    - wherein each of the predicted value and the realization time are based on a position of the point.

29. An apparatus for facilitating the entry of prediction data for a variable, comprising:
- a processor for executing stored program instruction steps; and
- a memory connected to the processor for storing the program instruction steps,
    - wherein the program instruction steps include steps to:
        - (a) electronically display a graph, the graph including a historical portion that includes historical values of the variable over time and also including a future portion;
        - (b) permit designation of a point on the future portion of the graph; and
        - (c) convert the point designated by said designation means into a predicted value for the variable at a realization time, and
    - wherein each of the predicted value and the realization time are based on a position of the point.

* * * * *